(12) United States Patent
Blieske et al.

(10) Patent No.: US 8,967,199 B2
(45) Date of Patent: Mar. 3, 2015

(54) ELECTRIC ACTUATED ROTARY VALVE

(71) Applicant: General Compression, Inc., Newton, MA (US)

(72) Inventors: Matthew Blieske, Francistown, NH (US); Simon Christopher Helmore, Somerville, MA (US)

(73) Assignee: General Compression, Inc., Newton, MA (US)

(*) Notice: Subject to any disclaimer, the term of this patent is extended or adjusted under 35 U.S.C. 154(b) by 0 days.

(21) Appl. No.: 13/626,659

(22) Filed: Sep. 25, 2012

(65) Prior Publication Data

US 2014/0083510 A1 Mar. 27, 2014

(51) Int. Cl.
*F16K 11/074* (2006.01)

(52) U.S. Cl.
USPC .............. 137/625.21; 137/876; 137/625.46; 137/625.47; 251/283

(58) Field of Classification Search
USPC ............. 137/625.46, 625.47, 625.21, 625.22, 137/876; 251/283
See application file for complete search history.

(56) References Cited

U.S. PATENT DOCUMENTS

| | | | | |
|---|---|---|---|---|
| 711,216 A | * | 10/1902 | Keyes | 137/625.47 |
| 1,342,900 A | * | 6/1920 | McGillivray | 137/625.22 |
| 1,657,841 A | | 1/1928 | Peris | |
| 2,730,089 A | | 1/1956 | French | |
| 3,038,499 A | | 6/1962 | Dumm | |
| 3,416,558 A | * | 12/1968 | Works | 137/246.22 |
| 3,430,919 A | * | 3/1969 | Frazier | 251/283 |
| 4,051,765 A | | 10/1977 | Saito | |
| 4,477,055 A | * | 10/1984 | Partridge | 251/174 |
| 4,566,672 A | * | 1/1986 | Giebeler | 251/192 |
| 4,575,045 A | | 3/1986 | Martin et al. | |
| 4,789,143 A | | 12/1988 | Smith et al. | |
| 5,081,966 A | | 1/1992 | Hansen et al. | |
| 5,497,736 A | | 3/1996 | Miller et al. | |
| 5,579,730 A | | 12/1996 | Trotter | |

(Continued)

FOREIGN PATENT DOCUMENTS

| | | |
|---|---|---|
| CN | 2672401 Y | 1/2005 |
| CN | 2898503 Y | 5/2007 |

(Continued)

OTHER PUBLICATIONS

"3-Way Stainless Ball Valves—Electric Actuated" [Online] Retrieved from the internet on Sep. 21, 2012: <http://www.valvestore.com/departments.asp?dept=1513>, (1 page).

(Continued)

*Primary Examiner* — John Rivell
*Assistant Examiner* — Umashankar Venkatesan
(74) *Attorney, Agent, or Firm* — Goodwin Procter LLP

(57) ABSTRACT

A rotary valve adapted for use in utility scale fluidic systems improves over conventional valving schemes by affording reductions in weight, pressure drop, cost, and actuation time, as well as providing improvements in decompression performance, higher pressure capability, and longer operational life. One embodiment of a three way valve assembly utilizes electric actuation to adjust decompression in real time and facilitate port shaping. The valve assembly utilizes a pressure balanced rotor and seals to reduce actuation and bearing loads, as well as increase seal life.

37 Claims, 19 Drawing Sheets

(56) References Cited

U.S. PATENT DOCUMENTS

| | | |
|---|---|---|
| 5,928,041 A | 7/1999 | Anderson et al. |
| 6,065,495 A | 5/2000 | Fong et al. |
| 6,240,946 B1 * | 6/2001 | Beasley ............ 137/15.06 |
| 6,451,467 B1 | 9/2002 | Peschke et al. |
| 6,470,913 B1 | 10/2002 | Woodworth |
| 6,715,570 B1 | 4/2004 | Downton et al. |
| 6,955,114 B2 | 10/2005 | Stockner et al. |
| 6,997,159 B2 | 2/2006 | Stockner et al. |
| 7,213,547 B2 | 5/2007 | Peliks et al. |
| 7,331,271 B2 | 2/2008 | Sanderson et al. |
| 7,871,082 B2 | 1/2011 | Zuurbier et al. |
| 8,167,172 B2 | 5/2012 | Yeames |
| 8,215,329 B2 | 7/2012 | Greeb |
| 2006/0021346 A1 | 2/2006 | Whelan et al. |
| 2009/0090880 A1 * | 4/2009 | Dolenti et al. ........... 251/129.03 |
| 2012/0111435 A1 | 5/2012 | Antonetti |

FOREIGN PATENT DOCUMENTS

| | | |
|---|---|---|
| CN | 201636382 U | 11/2010 |
| CN | 201731113 U | 2/2011 |
| CN | 201836439 U | 5/2011 |
| CN | 202001670 U | 10/2011 |
| DE | 3427931 A1 | 1/1986 |
| DE | 19834575 A1 | 2/2000 |
| EP | 0046524 A1 | 3/1982 |
| EP | 791772 A2 | 8/1997 |
| GB | 139404 A | 3/1920 |
| GB | 601217 A | 4/1948 |
| GB | 663462 A | 12/1951 |
| GB | 2416565 A | 2/2006 |
| JP | 2007064461 A | 3/2007 |
| JP | 2009216164 A | 9/2009 |
| NL | 1011161 C2 | 7/2000 |
| WO | WO-2005075275 A1 | 8/2005 |
| WO | WO-2008/141544 A1 | 11/2008 |

OTHER PUBLICATIONS

"3-way motorized ball valve" [Online] Retrieved from the internet on Sep. 21, 2012: <http://www.seekpart.com/company/30325/products/20101229155426186.html>, (2 pages).

"3 Way Rotary Valves" [Online] Retrieved from the internet on Sep. 21, 2012: <http://www.prahervalves.com/pagespool/electrical_actuator.html>, (1 page).

"3 Way Rotary Valves" [Online] Retrieved from the internet on Sep. 21, 2012: <http://www.prahervalves.com/pagespool/rotary_2%263.html>, (1 page).

"Electrical Actuated Ball Valve" [Online] Retrieved from the internet on Sep. 21, 2012: <http://www.bhagwanassociates.co.in/electric-actuated-valves.htm>, (1 page).

"Electric rotary valve actuator" [Online] Retrieved from the internet on Sep. 21, 2012: http://www.directindustry.com/prod/belimo/electric-rotary-valve-actuators-14910-506388.htm, (2 pages).

"Motorized 3 way brass ball valve" [Online] Retrieved from the internet on Sep. 21, 2012: <http://www.seekpart.com/company/7189/products/2010710153838347.html>, (1 page).

"PD, 3 Way, Pressure Compensated Flow Dividers" [Online] Retrieved from the internet on Sep. 21, 2012: <http://www.parker.com/portal/site/PARKER/menuitem.de7b26ee6a659c147cf26710237ad1ca/?vgnextoid=fcc9b5bbec622110VgnVCM10000032a71dacRCRD&vgnextdiv=687505&vgnextcatid=4769&vgnextcat=PD%2C+3+WAY%2C+PRESSURE+COMPENSATED+FLOW+DIVIDERS%2C+FLOW+SPLITS+ARE+50%2F50%2C+64%2F40+AND+70%2F30%2C+177+BAR+(2500+PSI)%2C+INPUT+FLOWS+ARE+19-131+LPM+(5-20+GPM)%2C+75-131+LPM+(5-35+GPM)&Wtky=&vgnextfmt=EN>, (1 page).

"RVK, RVB, RVD Three Way Rotary Valve" [Online] Retrieved from the internet on Sep. 21, 2012:<http://www.vpica.com/files/productos/234/rv.ficha_tecnica_en.pdf>, (4 pages).

"SEV Electric Control Ball Valve" [Online] Retrieved from the internet on Sep. 21, 2012: <http://pdf.directindustry.com/pdf/shanghai-sanzhou-automation-dash-co-ltd/sev-electric-control-ball-valve/66613-164876.html>, (9 pages).

International Search Report and Written Opinion for International Patent Application No. PCT/US2013/059414 dated Dec. 20, 2013 (11 pages).

* cited by examiner

SECTION A-A

SECTION B-B

FIGURE 8
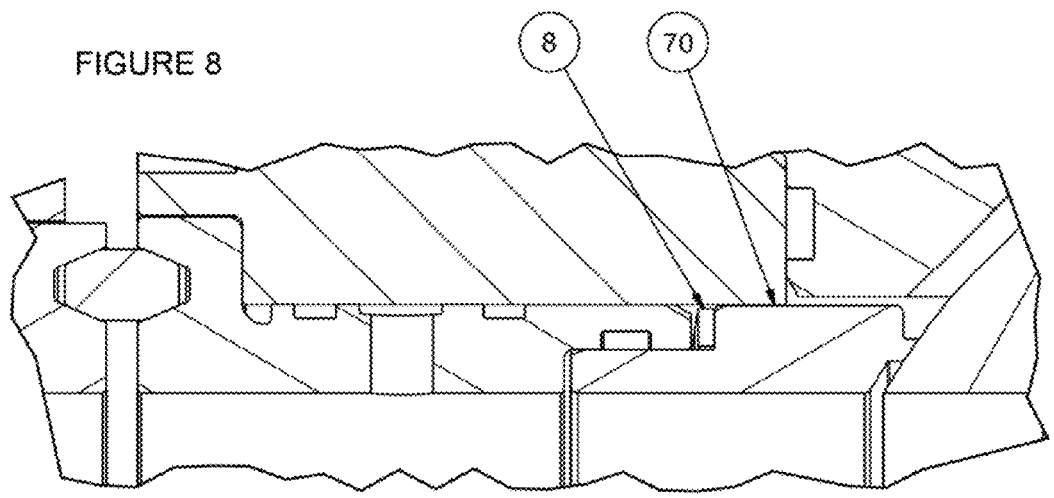
DETAIL D
PORT SEAL
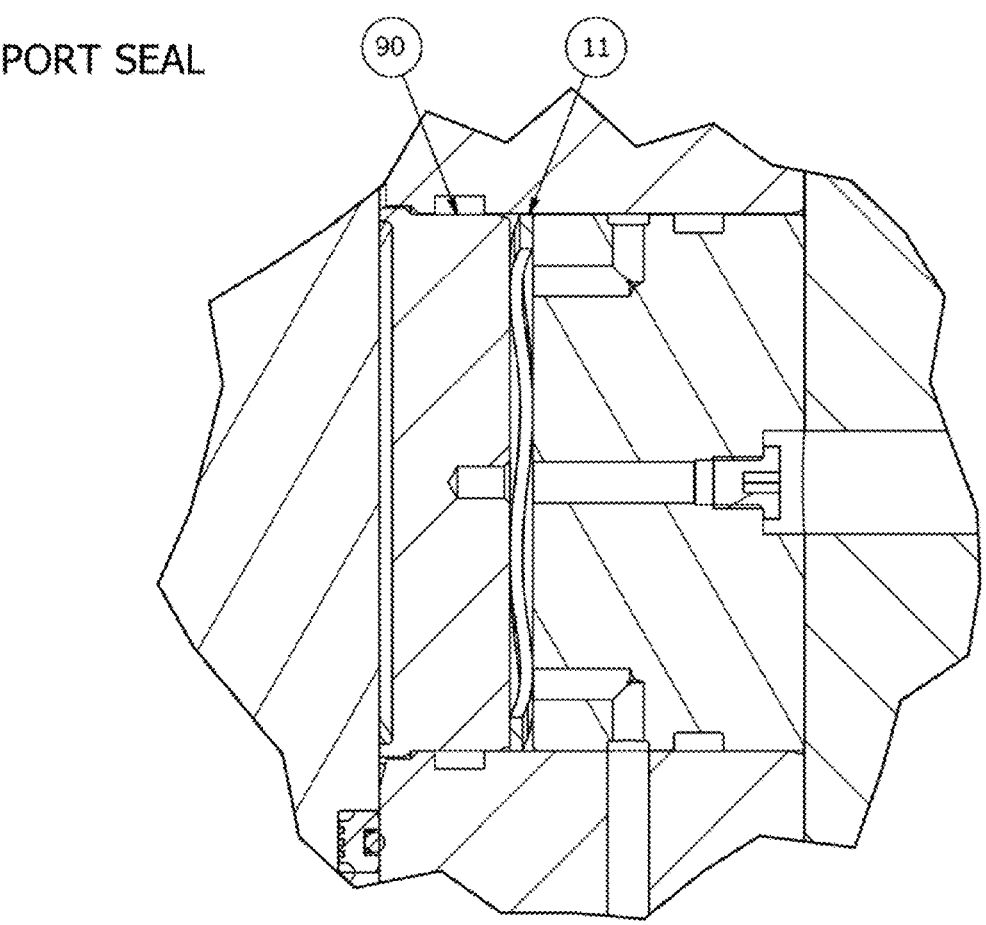
DETAIL E
COUNTERING SEAL

This example shows a high Port Pressure and a low Case Pressure. Because of the seal geometry (specifically the o-ring diameter), the seal is still balanced if the pressures are reversed.

The early portion of the actuation can be shaped according to the needs of decompression, by applying a variable amount of current to the rotor according to an arbitrary control method.

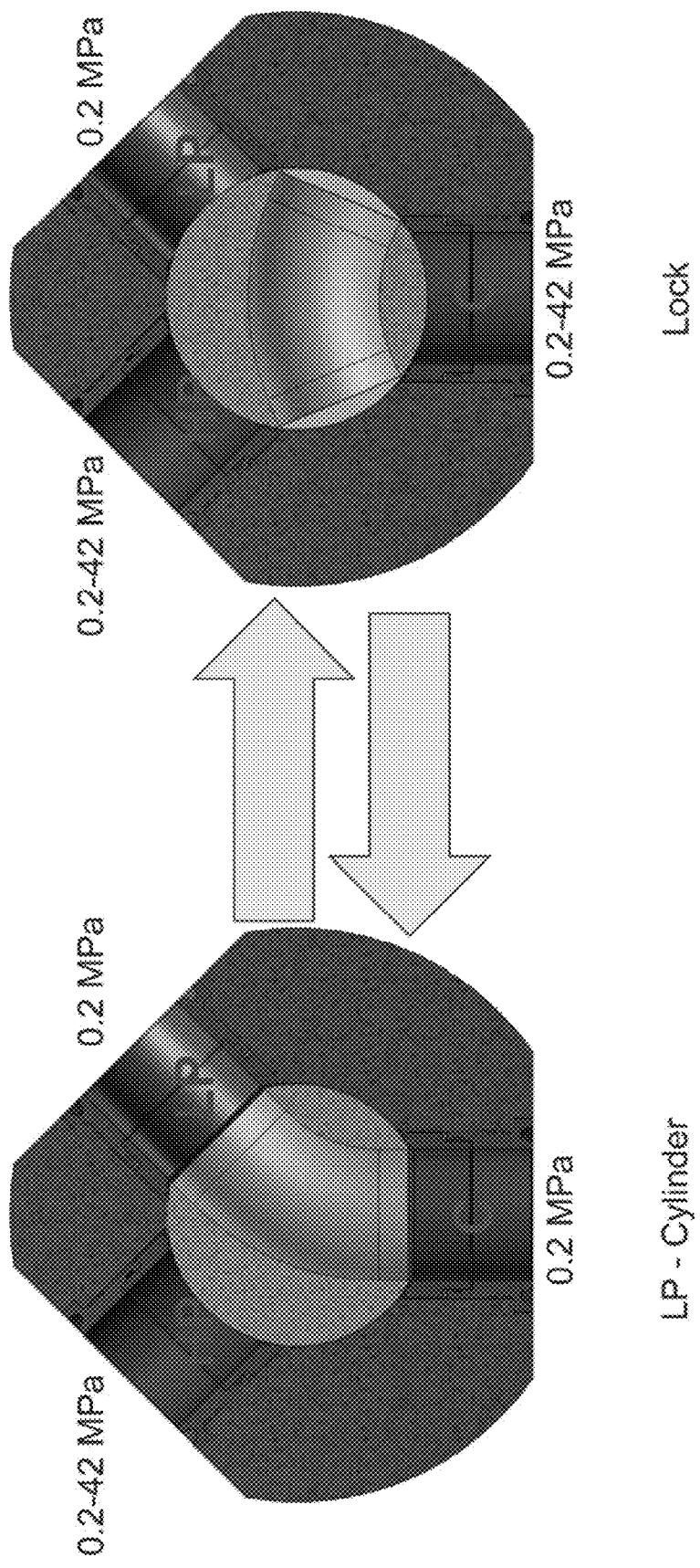

Mixed Balancing

Balancing on Ball

ELECTRIC ACTUATED ROTARY VALVE

FIELD OF THE INVENTION

The invention relates generally to fluidic system valves and, more particularly, to an electric actuated rotary valve assembly having a pressure balanced rotor adapted for use in utility scale hydraulic systems.

BACKGROUND

For flow control in large-scale hydraulic systems, poppet or other forms of linearly actuated valves are commonly used. In such systems, these valves are operable to control the flow of hydraulic fluid through the valve by linearly reciprocating an internal plunger between a closed position, that blocks flow through the valve, and an open position, that permits fluid flow between two or more ports. The valve may be controlled by hydraulic actuation; however, operation in this manner requires calibration, is expensive in terms of energy loss, and may result in increased erosion of the valve. Further, these types of valves operate slowly and require substantial energy to operate. They are also susceptible to temperature-induced oil viscosity changes that can result in erratic performance of the valves.

Standard rotary valves may instead be used to control flow; however, such valves are subject to their own unique problems, such as high bearing loads and required actuation torques at high pressures and flow path erosion experienced due to high flow rates and pressure gradients. Accordingly, there is a need for a valve that resolves the shortcomings of these existing solutions and, in particular, a valve that reduces cost, weight, pressure drop, and actuation time, as well as improves decompression performance, pressure capability, actuation energy consumption and operational life.

SUMMARY OF THE INVENTION

Hydraulically actuated compressed air energy storage (CAES) systems of the type described in U.S. Pat. No. 8,096,117 (the disclosure of which is incorporated herein by reference in its entirety) can benefit from such an improved electric actuated rotary valve system, though such systems are applicable to other hydraulic and pneumatic systems.

Accordingly, in one aspect, a rotary valve assembly includes a housing forming an inner chamber; a plurality of valve ports including at least one inlet port and at least one outlet port disposed about a periphery of the housing and in fluidic communication with the inner chamber; a rotor rotatably disposed within the inner chamber and including at least one internal flow passageway for providing fluidic communication between the inlet port and the outlet port; and a counterbalancing pressure port disposed in the housing and in fluidic communication with the inlet port and a surface of the rotor, whereby fluid entering the inlet port applies a balancing radial force component to the rotor at the pressure port.

In one embodiment, the housing includes a substantially cylindrical shell and opposing end plates. The plurality of valve ports may include three circular ports, which may be disposed at zero degrees, a range from 90 to 180 degrees, and a range from 180 to 270 degrees respectively about the periphery of the housing.

In another embodiment, the rotor includes a spherical portion for sealing engagement with the valve ports. The assembly may further include respective seals between the spherical portion and each valve port, and the seals may include pressure-balanced seals.

In yet another embodiment, the internal flow passageway is formed in the spherical portion and includes a flow path between the inlet port and the outlet port. The flow path may include an arcuate turn in a range of up to 90 degrees.

In some implementations, the rotor further includes cylindrical end portions extending from the spherical portion, and the pressure port includes a pair of pressure ports reacting against the end portions of the rotor. The pair of pressure ports may be opposite each of the plurality of valve ports, and/or may be located axially equidistant from the inlet port. In some embodiments, the counterbalancing pressure port is disposed opposite the inlet port.

In one embodiment, the assembly includes an actuator for rotating the rotor relative to the housing. The actuator may include an electric motor. In some embodiments, the electric motor includes a failsafe energy storage device for providing backup power to the motor, permitting continued operation of the valve assembly upon loss of a primary power source.

In another embodiment, the assembly further includes a second counterbalancing pressure port disposed in the housing and in fluidic communication with the inlet port and a surface of the rotor, whereby fluid entering the inlet port applies a balancing axial force component to the rotor at the second pressure port.

The rotary valve assembly may be adapted to operate continuously in a pressure range of up to at least about 420 Bar. The assembly may further be adapted to operate in at least one of a hydraulic system with a volumetric flow rate in a range of up to about 40,000 liters per minute and a pneumatic system with a volumetric flow rate in a range of up to about 225,000 liters per minute. In yet another embodiment, the assembly is adapted to operate in a hydraulic system with an actuation torque in a range of about 400 N-m to about 1200 N-m.

In another aspect, a method for controlling a rotary valve assembly adapted for use in a hydraulic system includes the steps of connecting an electric actuator to the rotary valve assembly and driving the electric actuator to control at least one of an opening profile and a closing profile of the rotary valve assembly. The driving step may further include varying an electric current to the actuator.

In yet another aspect, a method of pressure balancing a rotor in a rotary valve assembly adapted for use in a hydraulic system includes the steps of receiving a flow at an inlet port of the rotary valve assembly; channeling the flow to a counterbalancing pressure port in fluidic communication with the inlet port and a surface of the rotor; and applying, by the flow, a balancing radial force component to the rotor at the pressure port.

In one embodiment, the rotary valve assembly includes a housing forming an inner chamber, and a plurality of valve ports comprising the inlet port and at least one outlet port disposed about a periphery of the housing and in fluidic communication with the inner chamber, wherein the rotor is rotatably disposed within the inner chamber and includes at least one internal flow passageway for providing fluidic communication between the inlet port and the outlet port.

In one embodiment, the housing includes a substantially cylindrical shell and opposing end plates. The plurality of valve ports may include three circular ports, which may be disposed at zero degrees, a range from 90 to 180 degrees, and a range from 180 to 270 degrees respectively about the periphery of the housing.

In another embodiment, the rotor includes a spherical portion for sealing engagement with the valve ports. The assembly may further include respective seals between the spherical portion and each valve port, and the seals may include pressure-balanced seals.

In yet another embodiment, the internal flow passageway is formed in the spherical portion and includes a flow path between the inlet port and the outlet port. The flow path may include an arcuate turn in a range of up to 90 degrees In some implementations, the rotor further includes cylindrical end portions extending from the spherical portion, and the pressure port includes a pair of pressure ports reacting against the end portions of the rotor. The pair of pressure ports may be opposite each of the plurality of valve ports, and/or may be located axially equidistant from the inlet port. In some embodiments, the counterbalancing pressure port is disposed in the housing and opposite the inlet port.

In one embodiment, the assembly includes an actuator for rotating the rotor relative to the housing. The actuator may include an electric motor. In some embodiments, the electric motor includes a failsafe energy storage device for providing backup power to the motor, permitting continued operation of the valve assembly upon loss of a primary power source.

In another embodiment, the method further includes the steps of channeling the flow to a second counterbalancing pressure port in fluidic communication with the inlet port and a surface of the rotor, and applying, by the flow, a balancing axial force component to the rotor at the second pressure port.

The rotary valve assembly may be adapted to operate continuously in a pressure range of up to at least about 420 Bar. The assembly may further be adapted to operate in at least one of a hydraulic system with a volumetric flow rate in a range of up to about 40,000 liters per minute and a pneumatic system with a volumetric flow rate in a range of up to about 225,000 liters per minute. In yet another embodiment, the assembly is adapted to operate in a hydraulic system with an actuation torque in a range of about 400 N-m to about 1200 N-m Other aspects and advantages of the invention will become apparent from the following drawings, detailed description, and claims, all of which illustrate certain principles of various embodiments the invention, by way of example only.

BRIEF DESCRIPTION OF THE DRAWINGS

A more complete appreciation of the invention and many attendant advantages thereof will be readily obtained as the same becomes better understood by reference to the following detailed description, when considered in connection with the accompanying drawings. In the drawings, like reference characters generally refer to the same parts throughout the different views. Further, the drawings are not necessarily to scale, with emphasis instead generally being placed upon illustrating the principles of the invention.

FIG. 8 depicts enlarged schematic partial cross-sectional views of the port seal and the countering seal installed in the valve of FIG. 3.

FIGS. 12-17 are schematic representations of various actuation scenarios for one embodiment of the valve when integrated into a utility scale CAES system, such as the type described in the '117 patent mentioned above.

DETAILED DESCRIPTION

Described herein are various embodiments of a rotary logic valve usable in hydraulic, pneumatic, and other fluidic systems that accommodates various actuation techniques (including non-hydraulic actuation), and that includes a rotor that is pressure balanced irrespective of system operating pressure. In one embodiment, the valve may be electrically actuated, thereby requiring less actuation energy and enabling tailored actuation profile changes for adjusting decompression in real-time. The electric actuator may further contribute to design flexibility in port shaping and configuration of decompression actuation profiles independent of other parameters associated with the fluidic system.

Figure 1:
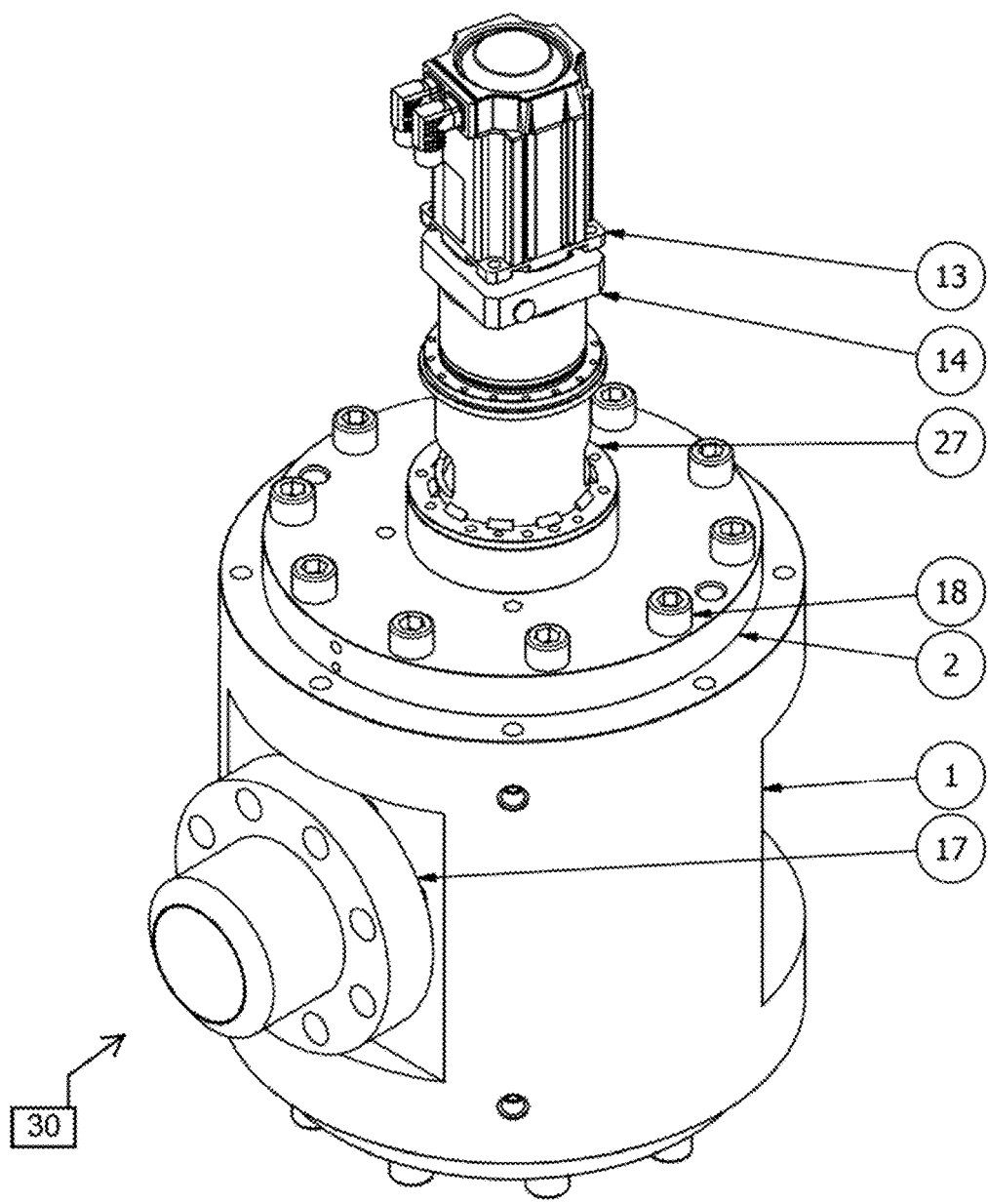
FIG. 1 is a schematic perspective view of an electrically actuated rotary valve, in accordance with one embodiment of the invention.

Referring to FIG. 1, depicted is a schematic perspective view of an electrically actuated rotary valve, in accordance with one embodiment of the invention. In this particular embodiment, the valve assembly is a three-way, 100 mm full port rotary valve. The valve assembly includes a cylindrical housing 1 forming an interior chamber for receiving a valve rotor. The housing 1 includes a gearbox 14, gearbox-to-valve adapter 27, and servo motor 13 at the top end for electrically actuating the valve rotor and a rotary encoder at the bottom end. In one embodiment, the housing 1 is approximately 480 mm in diameter and 660 mm in height and the overall assembly is about 1060 mm in height and weighs approximately 630 kg. The housing 1 may be constructed of steel, cast iron, or any suitable material. The assembly includes upper and lower end caps 2 affixed to the cylindrical housing 1 with cap screws 18, threaded rods and nuts, or any suitable fastening mechanism.

The rotary valve includes two or more circular valve ports 30 having bolt flanges 17. The ports 30 are arranged around the periphery of the housing 1, with at least one of the ports 30 adapted to act as an inlet port for accepting liquids and/or gases. One or all of the valve ports 30 may act as inlet and/or outlet ports. Although the valve is depicted as having a cylindrical body with three circular ports, it is to be appreciated that the housing may take any suitable form and size, and any number of ports of any suitable shape and size may be arranged in various positions on the housing while still accomplishing various objects of the invention. For example, the valve may include a four-walled, rectangular box housing with four square ports, one on each wall. In some embodiments, some of the ports are circular and have diameters in the range of about 50 mm to about 250 mm. In other embodiments, one or more ports are located on an upper and/or lower end cap 2 of the housing 1.

Figure 2:
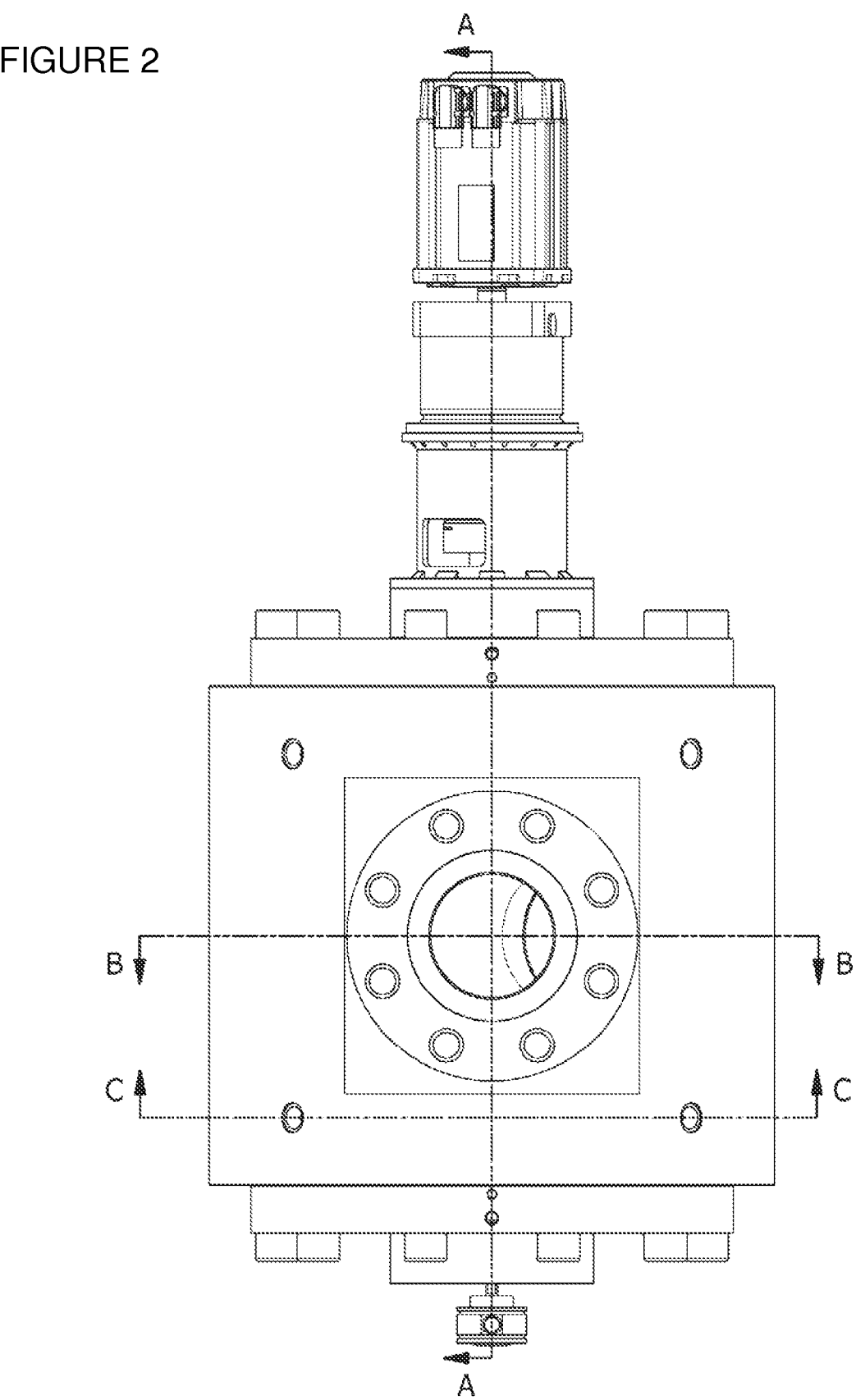
FIG. 2 is a schematic side view of the rotary valve of FIG. 1 aligned with one of the radial ports.
Figure 3:
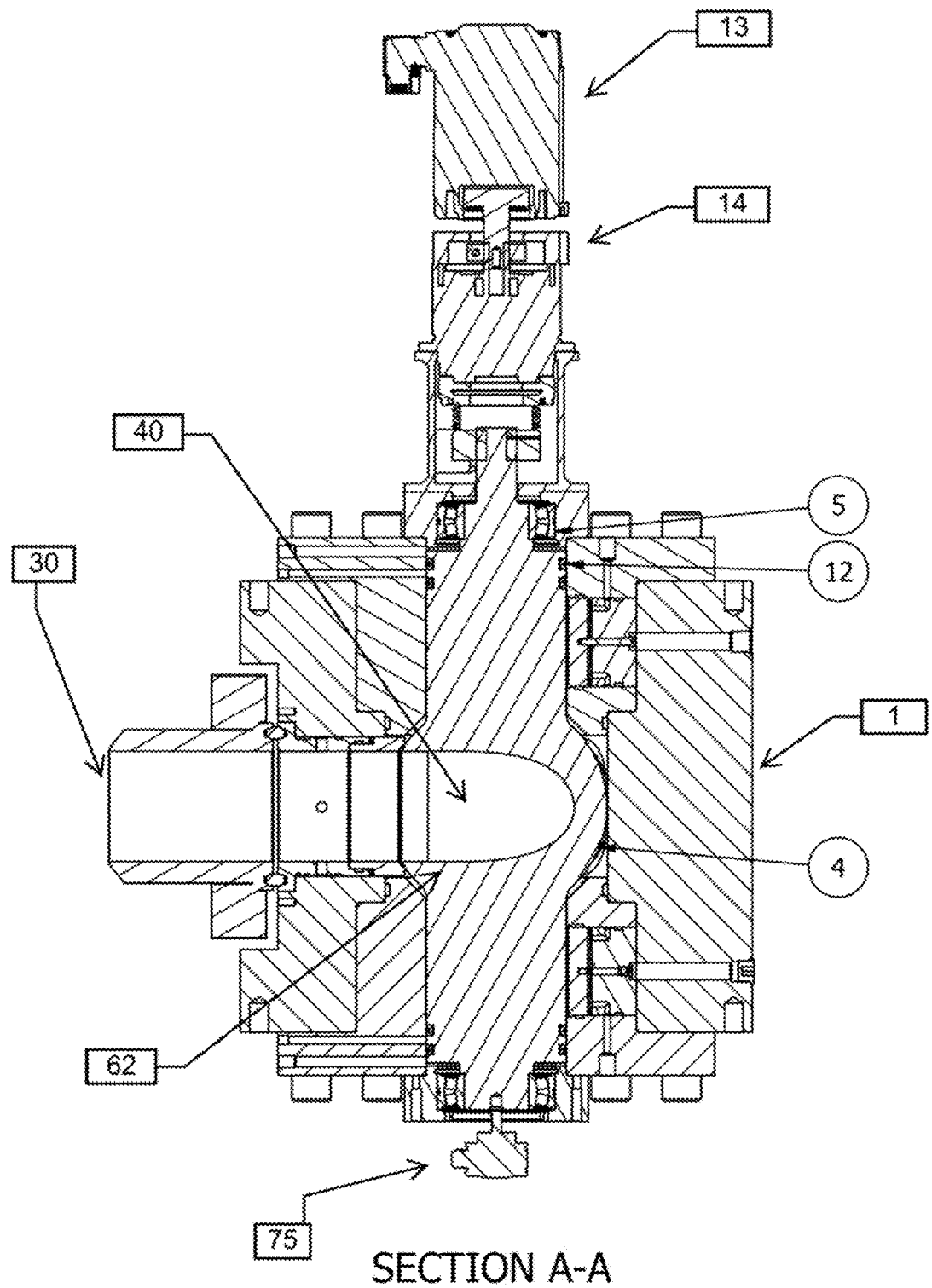
FIG. 3 is a schematic longitudinal cross-section of the rotary valve taken along line A-A of FIG. 2.

FIG. 2 is a schematic side view of the rotary valve of FIG. 1 aligned with one of the radial ports 30 and FIG. 3 is a schematic longitudinal cross-section of the rotary valve taken along line A-A of FIG. 2. In the depicted embodiment, the rotor 4 is disposed within the interior chamber of the housing 1 and rotates about its longitudinal axis by means of the electric motor 13 and gearbox 14. The rotor 4 has generally cylindrical upper and lower end portions, bounding a substantially spherical center portion 62 aligned with the valve ports 30.

Figure 4:
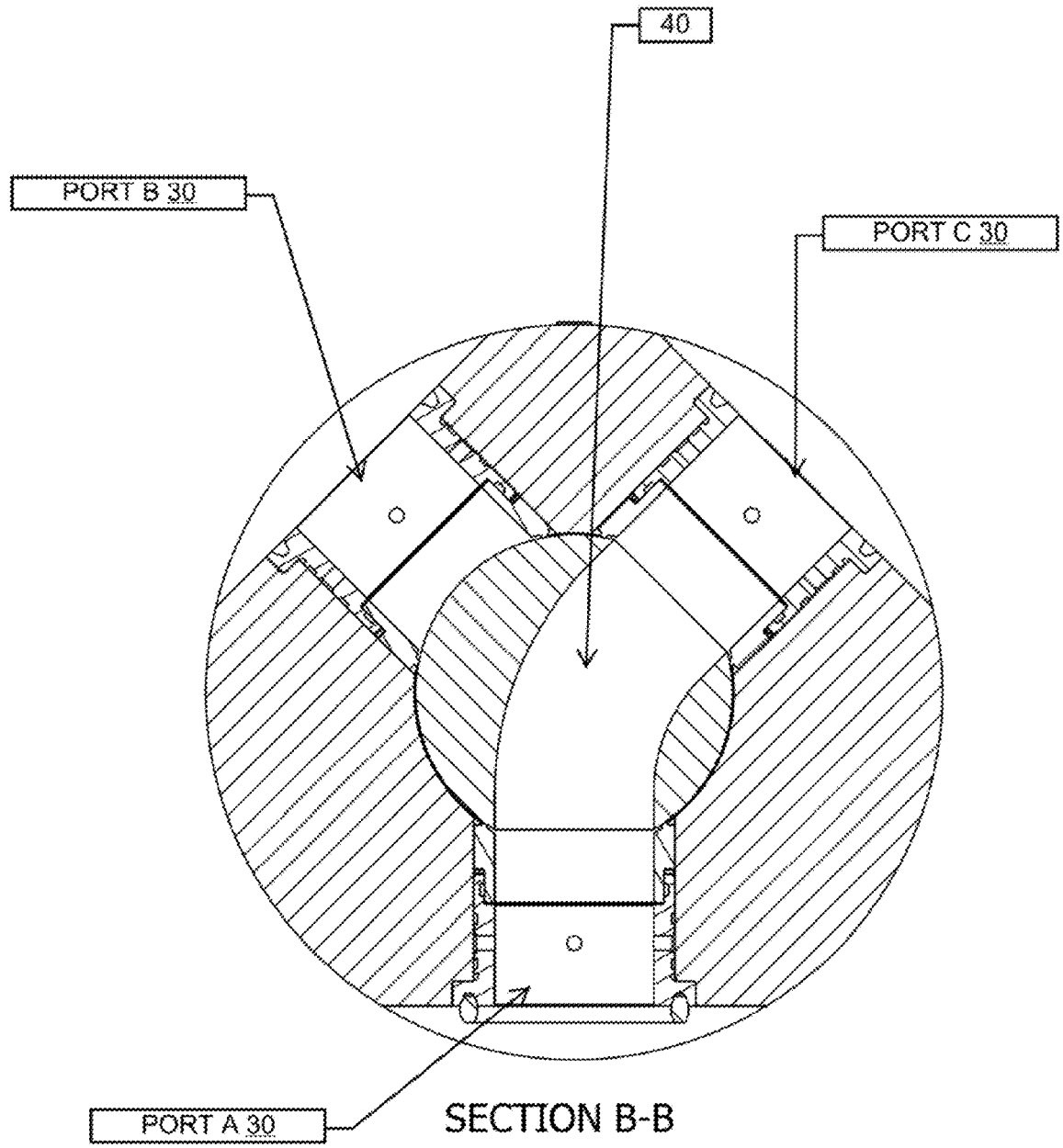
FIG. 4 is a schematic radial cross-section of the rotary valve taken along line B-B of FIG. 2.

The spherical portion 62 of the rotor 4 includes a flow passageway 40 adapted to block flow and also selectively to direct flow between housing ports 30, for example from an inlet port to an outlet port, based on the circumferential orientation of the rotor 4 relative to the housing 1. In one embodiment, the flow passageway 40 redirects the inlet flow through a 135° bend, to minimize flow losses and resultant pressure drop, while using a relatively small diameter rotor 4. For example, FIG. 4 is a schematic radial cross-section of the rotary valve assembly taken along line B-B of FIG. 2. As shown in this cross-section, there are three ports 30 formed in the housing 1 and the flow passageway 40 extending through the rotor 4 includes a 45° bend (135° from port A) to accommodate the three valve ports 30 positioned at 0° (port A), 135° (port B), and 225° (port C) on the periphery of the cylindrical housing 1. It is to be appreciated, however, that any number of ports 30 and any bend angle value for the flow passageway 40 may be accommodated to accommodate a particular application. For example, the bend angle may be selected in the range of 0° (i.e., no bend) to 90° or more, if desired. If three coplanar ports are used and port A is fixed at 0°, port B may be positioned in the range of less than 90° to 180° and port C in the range of 180° to 270° or more. In embodiments where the valve ports 30 are not coplanar (e.g., port A is disposed on an end cap 2), the flow passageway 40 may extend in any suitable dimension and angle to direct flow between the ports 30.

In the three port configuration, the motor 13 rotates the rotor 4, such that the flow passageway 40 is aligned with one valve port, a pair of valve ports, or no valve ports (i.e., when the surface of the spherical portion of the rotor 4 is in sealing contact simultaneously with all of the valve ports 30). To maintain fluid pressure in the flow passing through the valve assembly and prevent leakage, the rotary valve assembly advantageously includes a sealing interface between the rotor 4 and the end caps 2 of the cylindrical housing 1, such as a rotary seal 12, which may be one or more standard rotary or O-ring seals disposed in grooves formed in the cylindrical end portions of the rotor 4.

When the rotor 4 is turned to pass pressurized fluid from an inlet port 30 through the flow path 40 in the rotor 4 to an outlet port 30 at a lower pressure, a violent (uncontrolled) decompression event may occur, depending on the factors such as the volumetric flow rate and the differential pressure between the high pressure source and the low pressure sink. Due to the violence of the decompression, high velocity flows occur around sharp edges and the like within the rotary valve, potentially causing significant erosion over repeated valve opening and closing cycles. Mechanical shaping of the rotor may be used advantageously to reduce the effects of erosion on the edges of the valve ports. For instance, the mouths of the ports (i.e., where the ports meet the spherical portion of the rotor 4) may be non-spherical or notched to gradually shape the decompression curve, avoiding erosion and dramatic pressure waves in the low pressure sink region.

To further reduce erosion, an overlap may be included in the rotor and seal area. The valve ports 30 may have slightly oversized seals, thereby providing a sacrificial portion of the rotor 4 that can erode before the erosion extends beyond the seal line. This erosion may be significantly larger than that permitted in linear valves, on the order of 6 mm or greater. In addition, sharp edges in the rotor 4 may be hardened and/or coated with ceramic to provide additional protection against wear and premature seal leakage.

To facilitate rotation of the rotor 4, dual bearings 5 (e.g., taper roller bearings, spherical bearings, toroidal bearings, and the like) may be positioned around trunnions extending from the longitudinal cylindrical end portions of the rotor 4. In a traditional configuration of a rotary valve, the rotor bearings 5 have to withstand and react a radial force equal to the port pressure multiplied by the port area. For applications of the hydraulic valve assembly in a utility scale CAES system, this force could easily be on the order of approximately 442 kN (44 tons) or greater, necessitating a massive rotor and valve housing, along with extremely large bearings and exceedingly high actuation torques to rotate the rotor 4. To obviate the substantial forces on the rotor 4 required to be reacted by the dual bearings 5, the radial force on the rotor 4 at the inlet port can be counterbalanced by a pair of counter pressure zones on an opposite side of the rotor 4, each with half the area of the inlet port, resulting in a substantially zero net force. It is to be appreciated, however, that the linear forces and torques on the rotor 4 need not result in a zero net force. Instead, the balancing forces described herein may reduce forces on the rotor to levels that allow for reductions in the size of and strength of the motor and rotor bearings as well extend the operating life thereof. Accordingly, references made herein to substantially zero net forces, total required balancing forces and the like contemplate these levels of forces.

Figure 5:
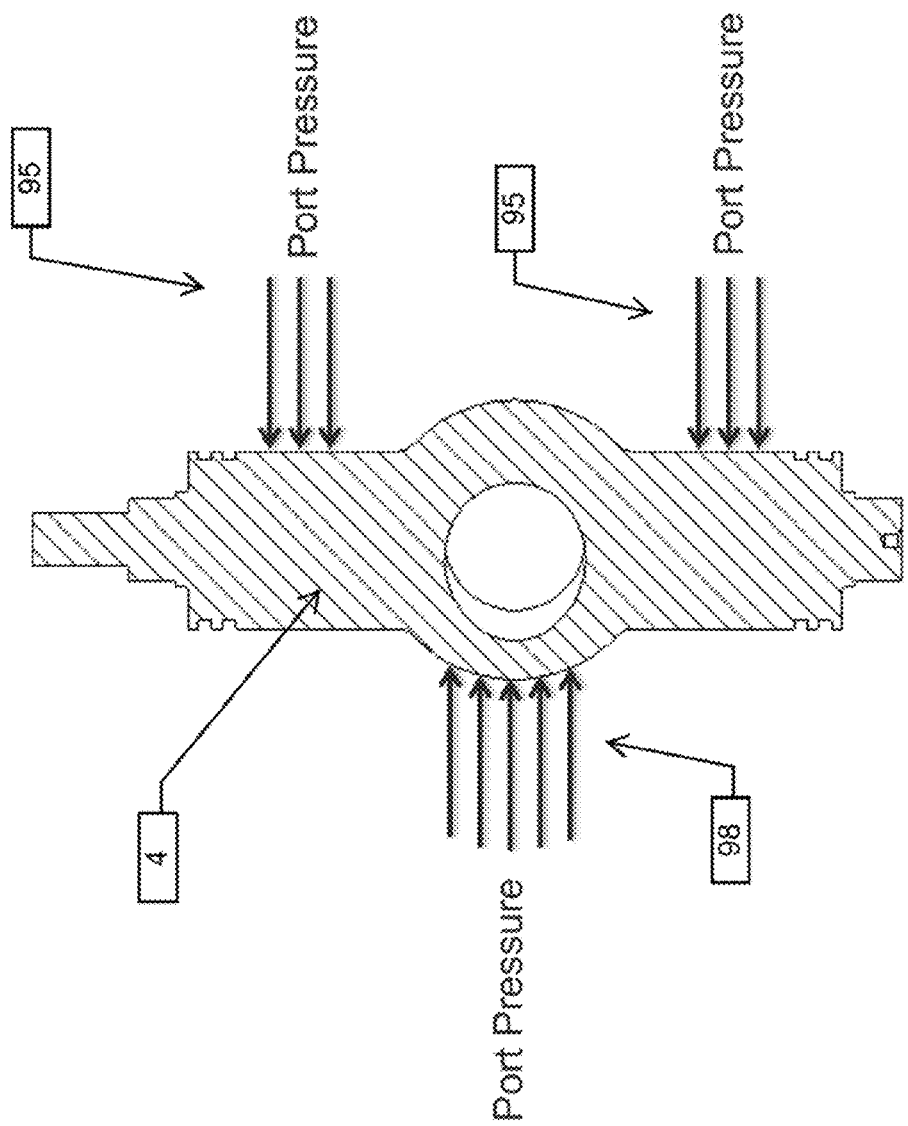
FIG. 5 is a schematic free body diagram of a pressure balanced rotor of a valve in accordance with one embodiment of the invention.

FIG. 5 is a schematic free body diagram of such a pressure balanced rotor 4 in accordance with one embodiment of the invention. The counter pressure zones 95 may be positioned symmetrically above and below the inlet port pressure zone 98, diametrically opposed from the inlet port pressure zone 98. See pressure ports 35 in FIG. 3. Pressurized fluid (e.g., hydraulic fluid) from the inlet port 30 at the inlet port pressure zone 98 is plumbed to the opposing side of the housing 1 to the pressure ports 35 to provide counterbalancing radial forces against the rotor 4 to counteract most or substantially all of the radial force on the rotor 4 and bearings 5 from fluid/gas entering the inlet valve port 30.

Depending on the configuration of the rotor, the housing and number of inlet/outlet ports, there are one or more countering pressure ports 35 to provide, alone or in combination, an interface for fluid to react the total required balancing force against the rotor 4. The pressure ports 35 may be of various shapes and/or sizes and may be positioned at any point along the rotor 4 and/or at any angle to a valve port 30 in order to provide the desired counterbalancing force to the rotor 4. Accordingly, referring to FIGS. 6 and 7, in an embodiment having three valve ports 30a, 30b, 30c usable as inlet ports, the assembly may be adapted to apply rotor-balancing forces in three locations (e.g., three pairs of upper and lower pressure ports 35a, 35b, 35c, each pair positioned opposite one of the three valve ports 30a, 30b, 30c, respectively). In other instances, the rotary valve assembly may be configured to apply balancing forces normal to the surface of the spherical portion 62 of the rotor 4, axially to the cylindrical ends of the rotor 4, axially to the trunnions of the rotor 4, or at any other angle or position suitable for balancing the rotor 4.

Figure 6:
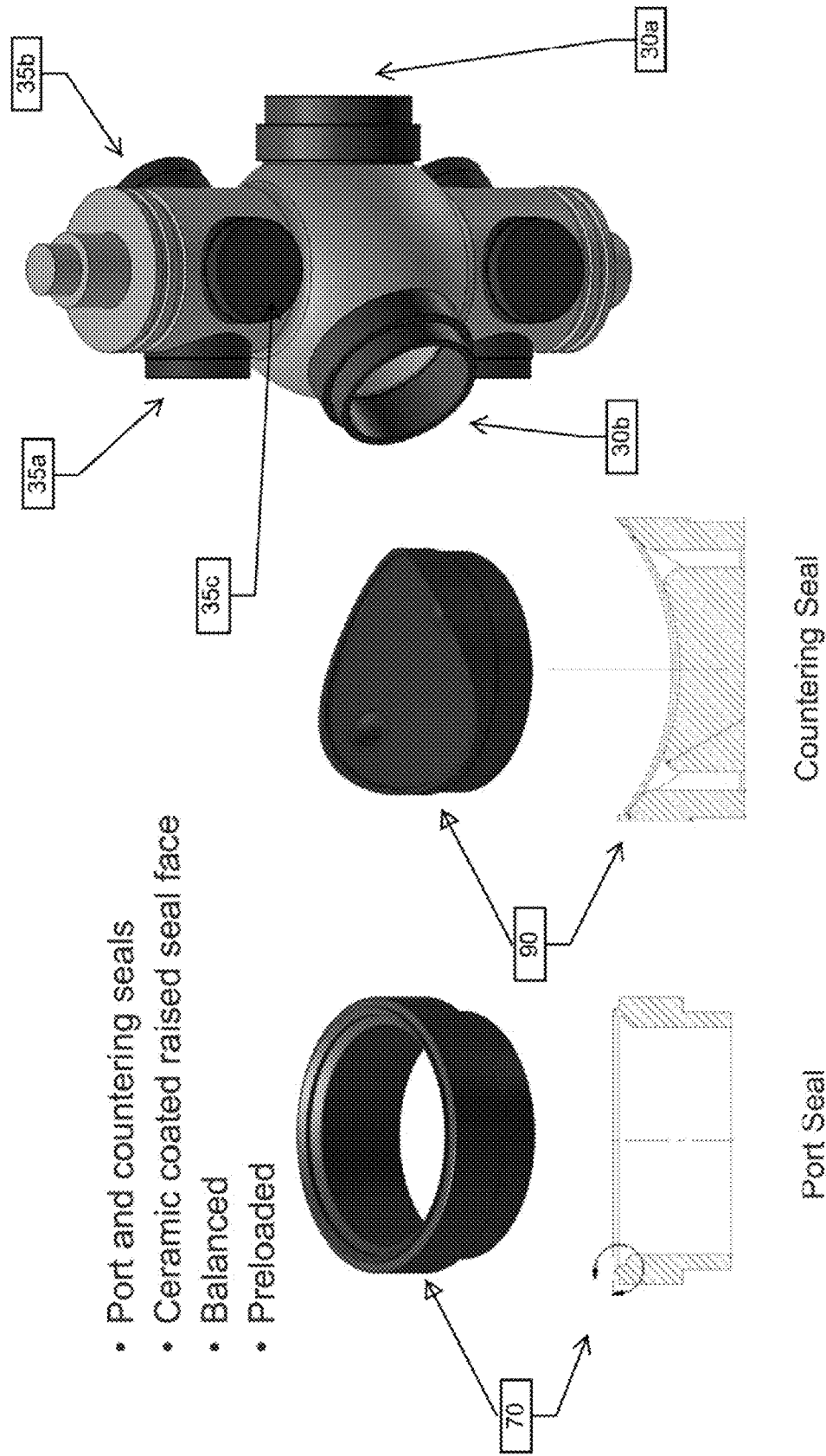
FIG. 6 is a perspective view of a rotor and associated port seals and pressure balance countering seals in accordance with one embodiment of the invention, including schematic perspective and cross-sectional views of the port and countering seals.
Figure 7:
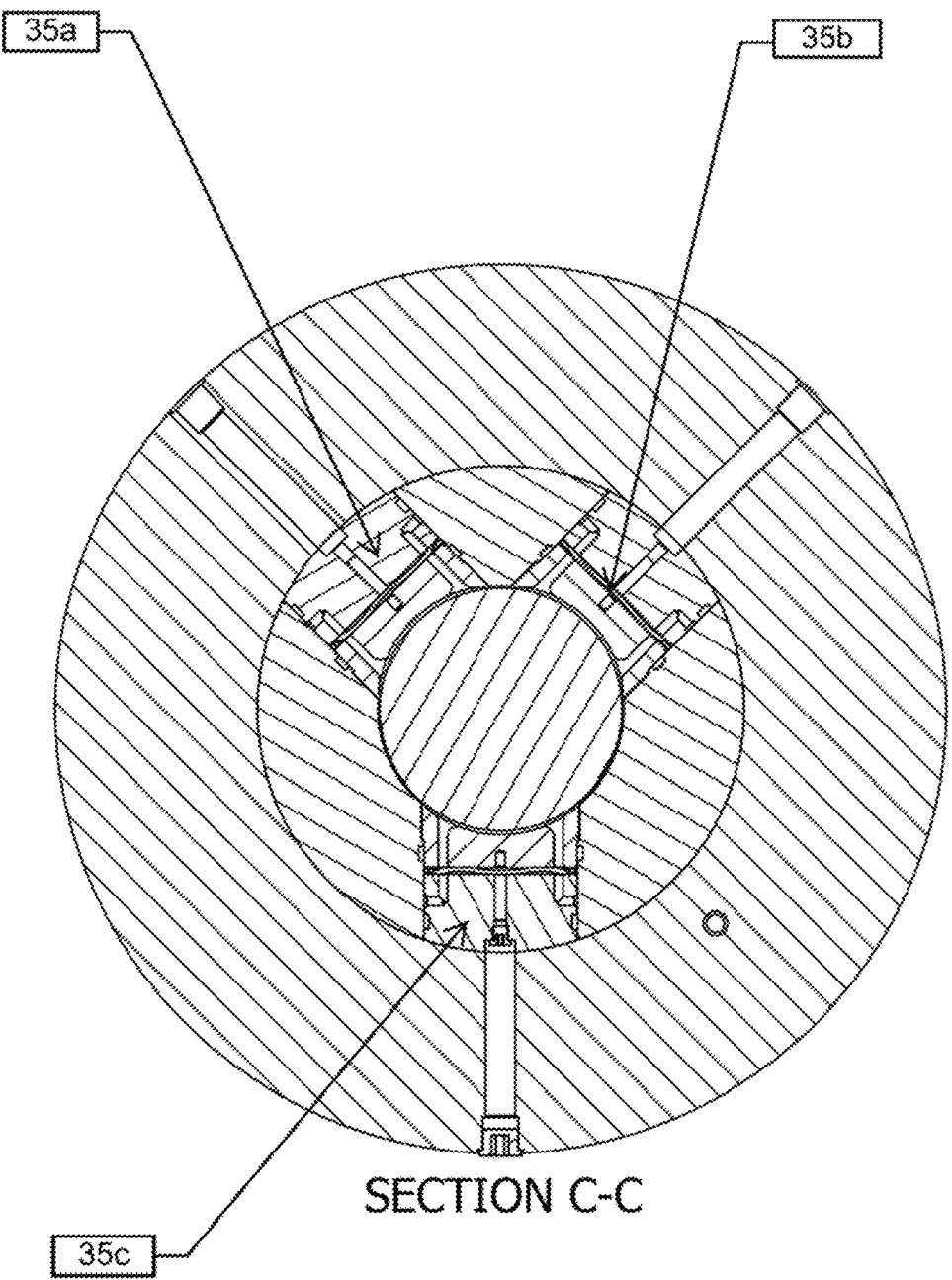
FIG. 7 is a schematic radial cross-section of the rotary valve taken along line C-C of FIG. 2.

To avoid leakage of fluid and/or gas to and from the valve ports 30 and pressure ports 35, the valve assembly includes sealing components between the rotor 4 and the ports 30, 35, such as valve port seals 70 and countering pressure port seals 90. More specifically, FIG. 6 depicts a perspective view of the rotor and associated port seals 70 and pressure balance countering seals 90 in accordance with the three port embodiment of the invention, including schematic perspective and cross-sectional views of the port and countering seals 70, 90. FIG. 7 is a schematic radial cross-section of the rotary valve taken along line C-C of FIG. 2 through the plane of the lower pressure ports 35a, 35b, 35c and associated countering seals 90.

FIG. 8 depicts enlarged schematic partial cross-sectional views of one of the port seals 70 and one of the countering seals 90 installed in the valve of FIG. 3. The seals 70, 90 and rotor 4 may be hardened to minimize wear due to rubbing and/or oil jet erosion. For example, the rotor 4 and the seals 70, 90 may be coated with a layer of extremely hard tungsten carbide or ceramic, and the seals 70, 90 may be laser-hardened or nitrided. To ensure a close tolerance fit between the hardened rotor 4 and the seals 70, 90, the seals can be match lapped to the rotor 4. As the seals 70, 90 and rotor 4 wear, they continue to mate against each other, providing a long-term reliable sealing effect. Wave springs 8, 11 react respectively against the seals 70, 90 to provide a desirable preload to keep the seals 70, 90 against the rotor 4; however, any appropriate means of biasing the seals 70, 90 against the rotor 4 may be used.

The seals 70, 90 feature a pressure balanced configuration, that results in substantially zero net force from pressure inside or outside of the seals 70, 90. Without such a pressure balanced design, the seals 70, 90 would have a tendency to either be forced away from the rotor 4 and leak, or dig into the rotor 4, locking the rotor 4 in place and accelerating component wear and failure.

Figure 9:
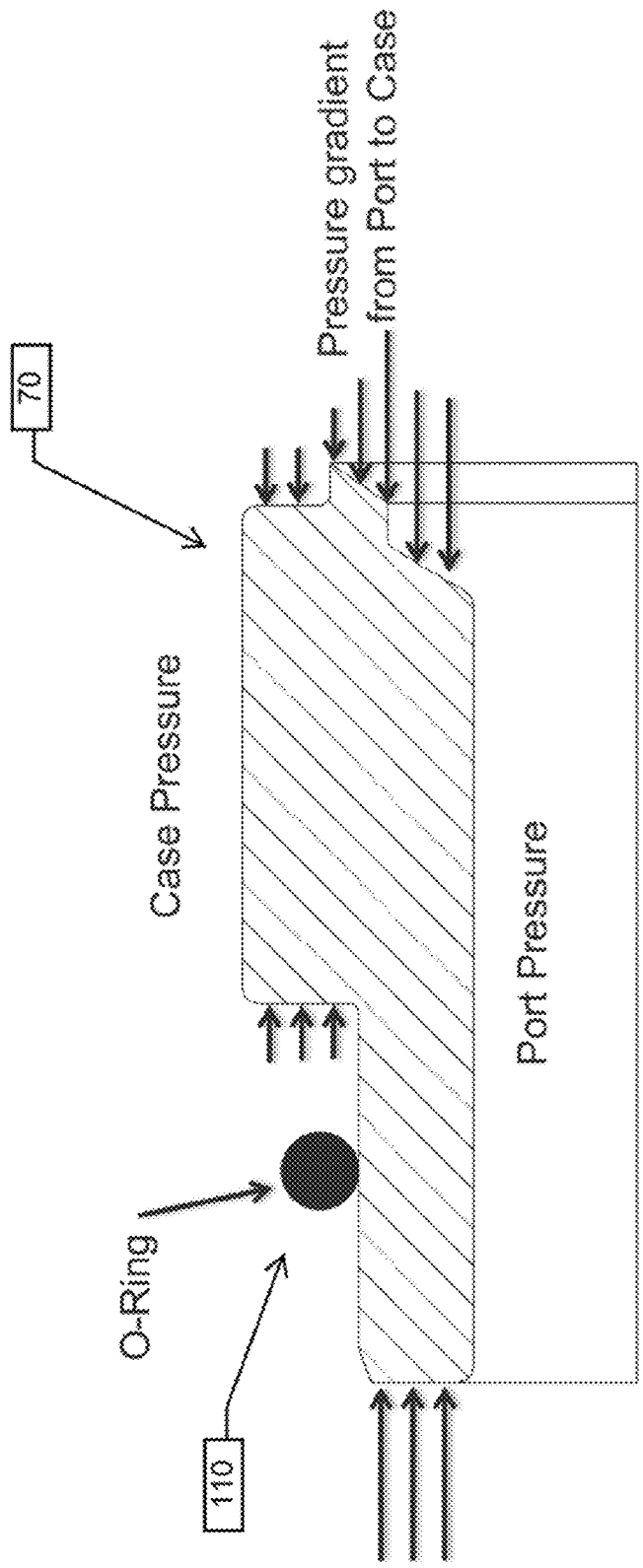
FIG. 9 is a schematic free body diagram of a port seal of a valve in accordance with one embodiment of the invention.

FIG. 9 is a schematic free body diagram of one of the port seals 70 in accordance with one embodiment of the invention, illustrating the forces acting on the port seal 70 when there is high pressure within the valve port 30 and lower pressure external to the port 30 within the housing 1. The port seal 70 is generally annular. Because the annular sealing surface of the seal 70 is match fit to the spherical curvature of the rotor 4, the pressure gradient across the seal 70 surface causes an imbalance in forces acting on the seal 70. To resolve the imbalance, the port seal 70 is geometrically configured such that the seal 70 remains balanced irrespective of the pressure distribution, and the forces applied over the surface of the seal 70 result in a substantially net zero force. In the illustrated embodiment, the radial faces of the seal 70 are dimensioned and an O-ring 110 around the port seal 70 is sized and positioned so as to ensure opposing axial forces on the seal 70 are balanced, regardless of the differential pressure across the seal 70.

Figure 10:
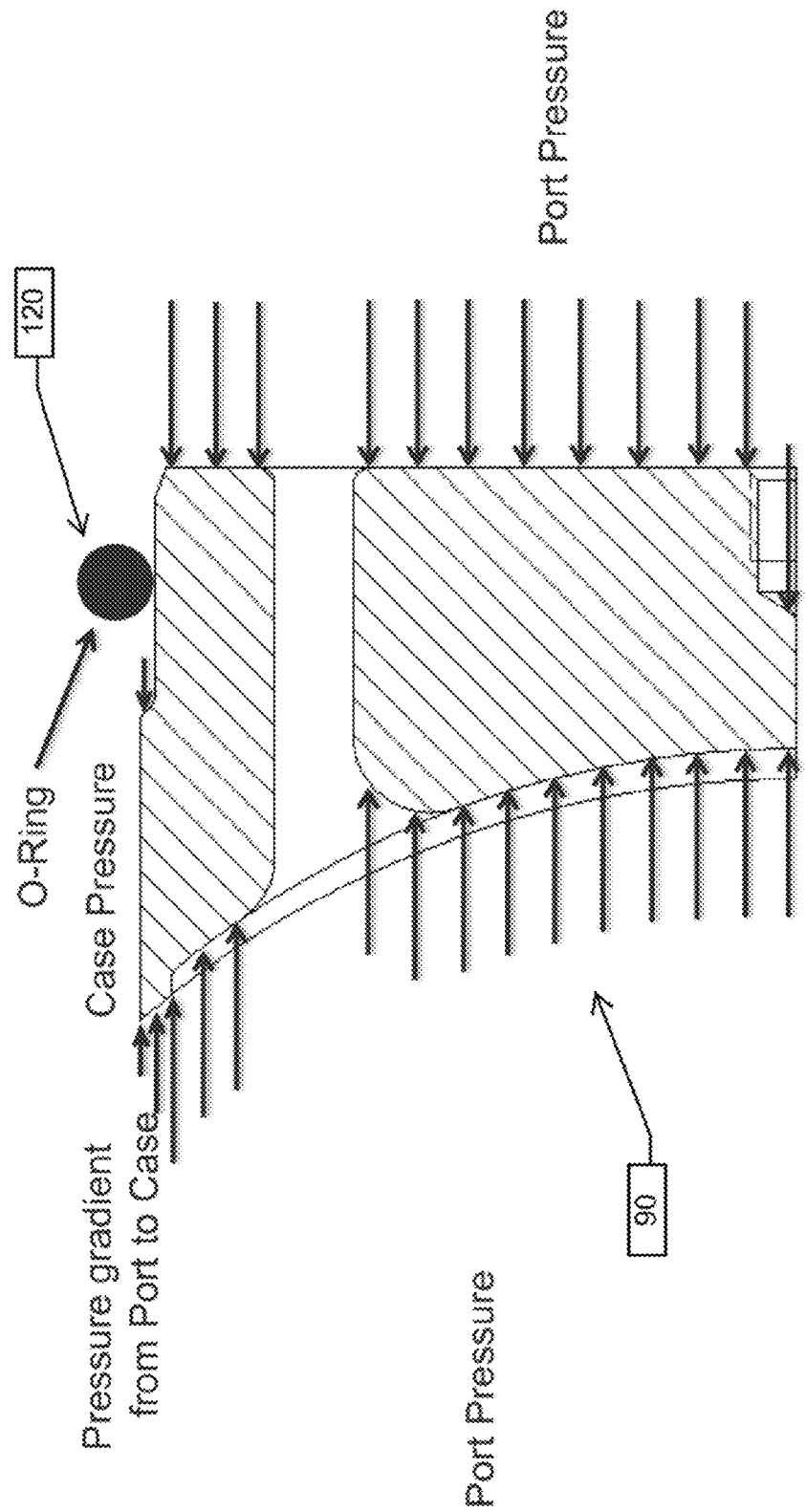
FIG. 10 is a schematic free body diagram of a countering seal of a valve in accordance with one embodiment of the invention.

Similarly, FIG. 10 is a schematic free body diagram of one of the countering seals 90 in accordance with one embodiment of the invention. The countering seal 90 is generally cylindrical and may include one or more apertures extending from a rear face to a contoured face generally matching the contour of the proximate rotor portion. The apertures provide flow paths of the balancing fluid to the rotor surface. Here again, the countering pressure port seal 90 is sized and configured to maintain a balanced distribution of forces acting on the seal 90, regardless of whether the pressure within the countering pressure port 35 is higher or lower than the pressure in the housing 1. As with the valve port seals 70, the radial faces of the countering seal 90 are dimensioned and a sealing element, such as O-ring 120 around the counter seal 90, is sized and positioned so as to ensure opposing axial forces on the seal 90 are balanced, regardless of the pressure differential across the seal 90.

In one embodiment, the rotary valve is electrically actuated via a DC electric motor 13, a 7:1 ratio gearbox 14, and a rotor adapter 27 subassembly. The subassembly may further include a flexible bellows coupler that connects the gearbox 14 output to the rotor 4. The motor and gearbox are sized to provide fast actuation and long life. The electric actuator and/or a motor driver that controls the flow of power to the motor may also contain an energy storage device, such as a battery or capacitor. The energy storage device enables the valve to be actuated in the event of a power outage or other electrical interruption, and further allows for regenerative braking of the valve rotor 4. This may reduce energy consumption by more than 50% relative to that used by a typical resistance load, depending on actuation speed, friction, and other factors. In other embodiments, the rotary valve may include other actuation mechanisms, such as those relying on hydraulic, pneumatic, mechanical, electro-mechanical, or other systems.

Figure 11:
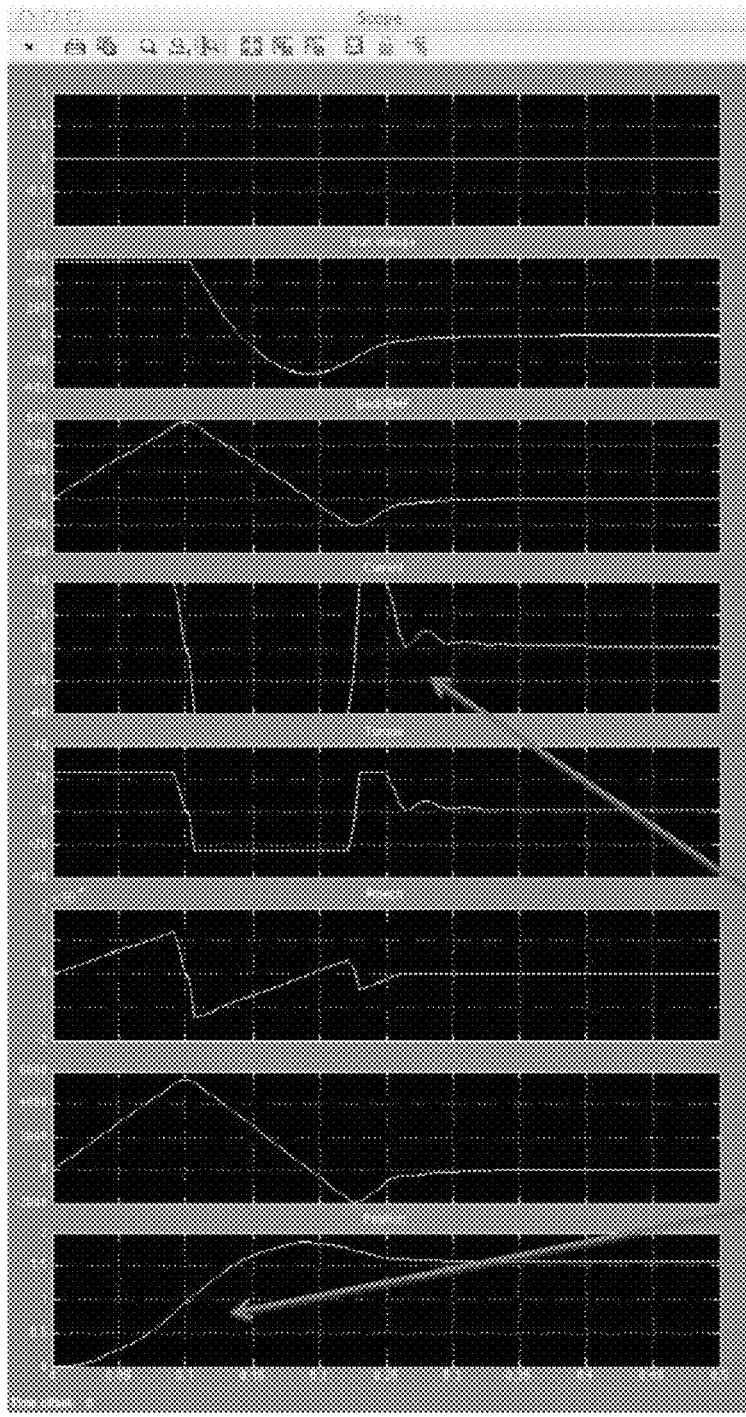
FIG. 11 is a schematic output of a simulation of electric actuation for the valve depicted in FIG. 1 in accordance with one embodiment of the invention.
Figure 12:
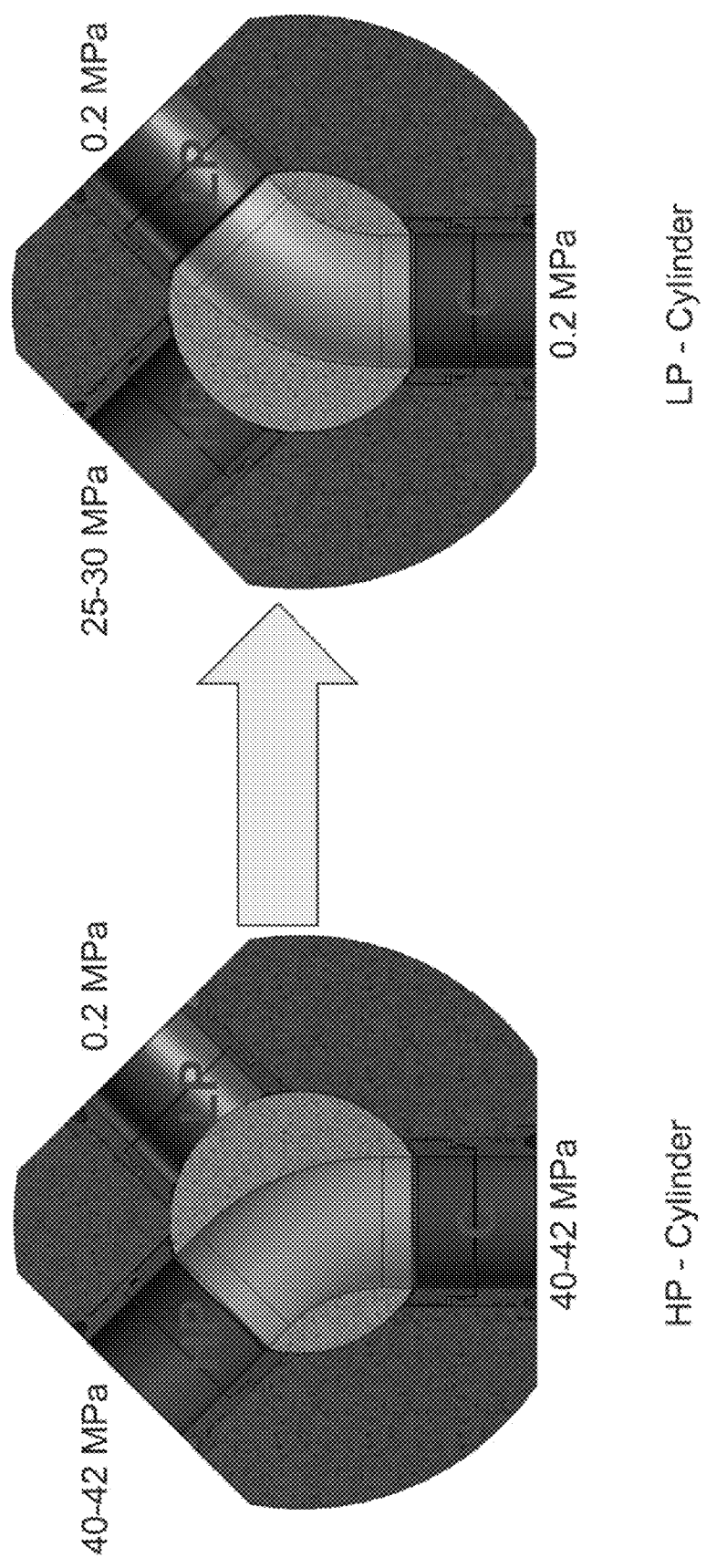
Figure 13:
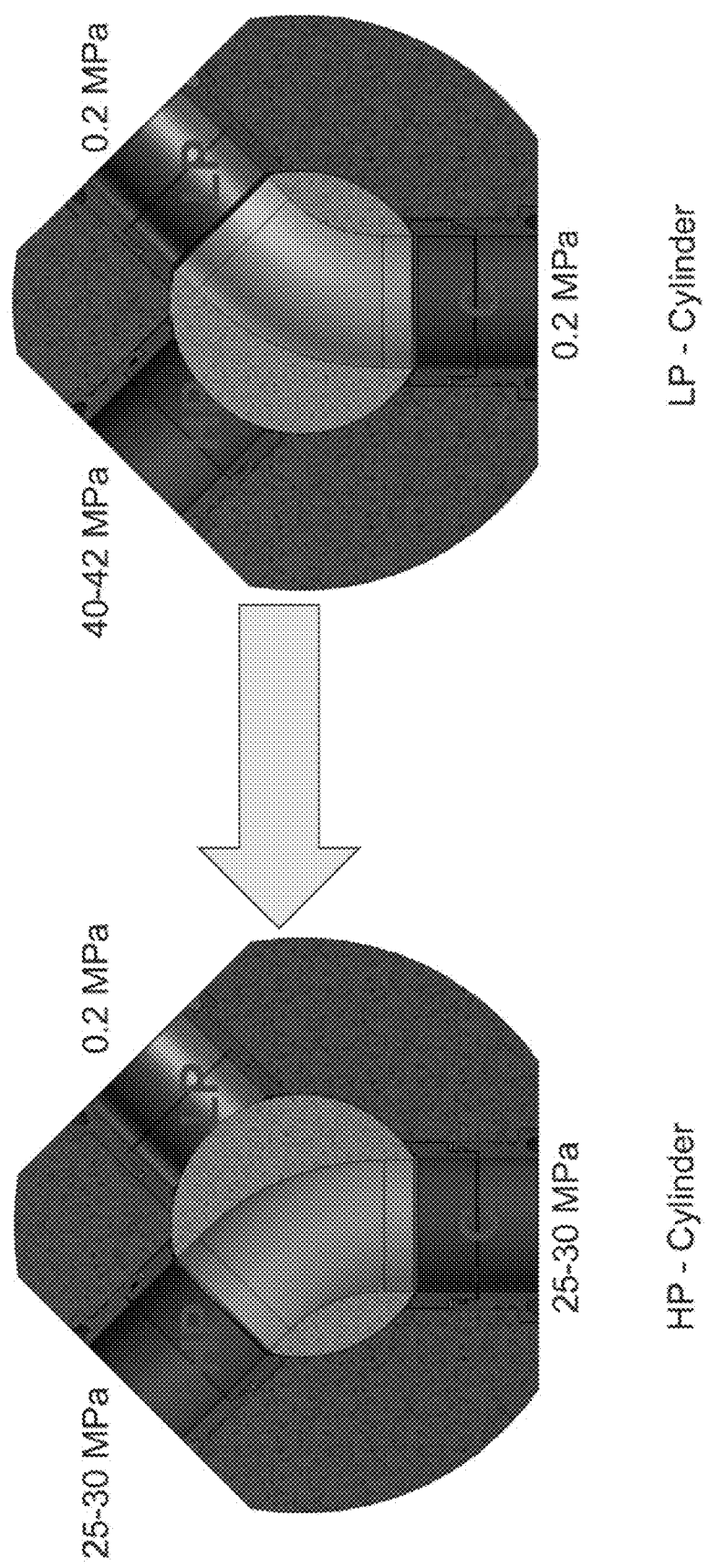
Figure 14:
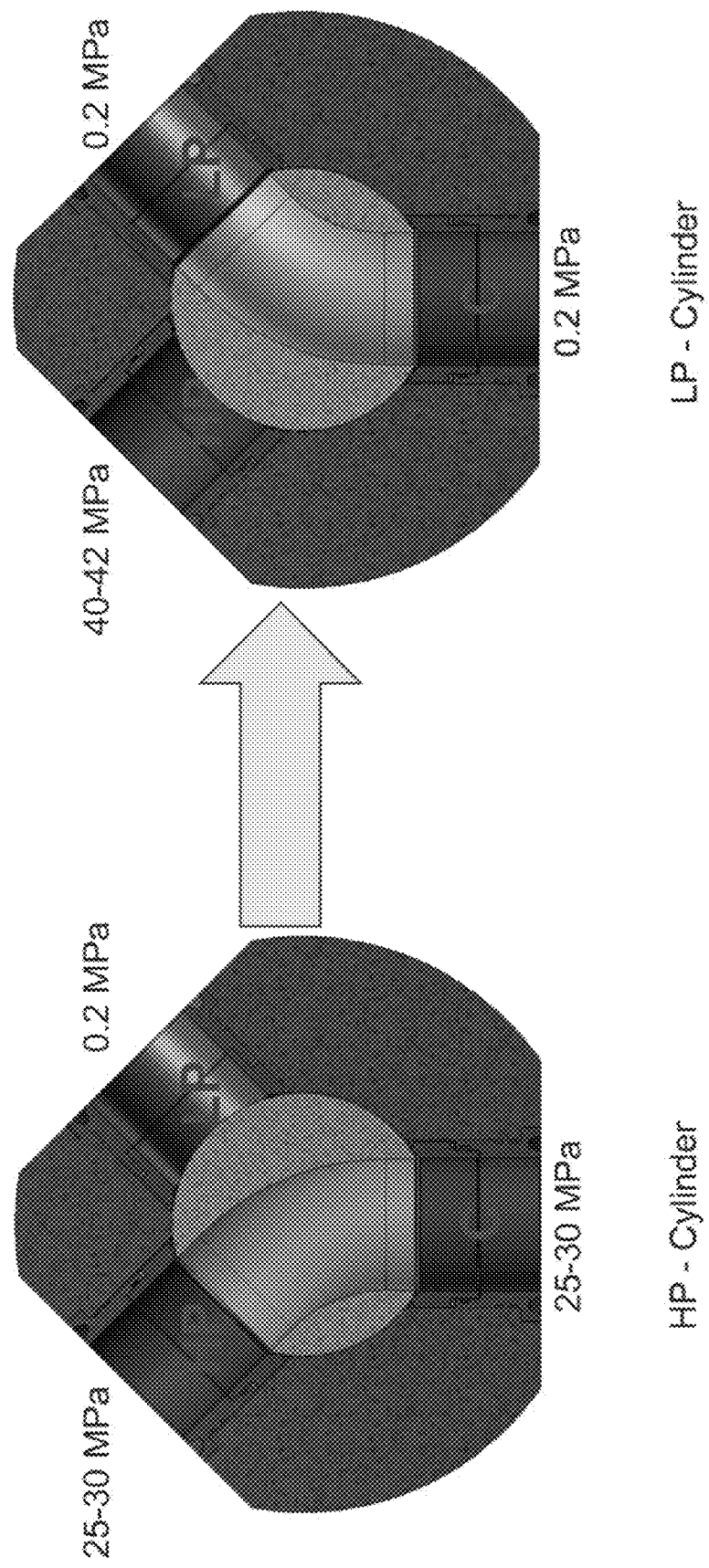
Figure 15:
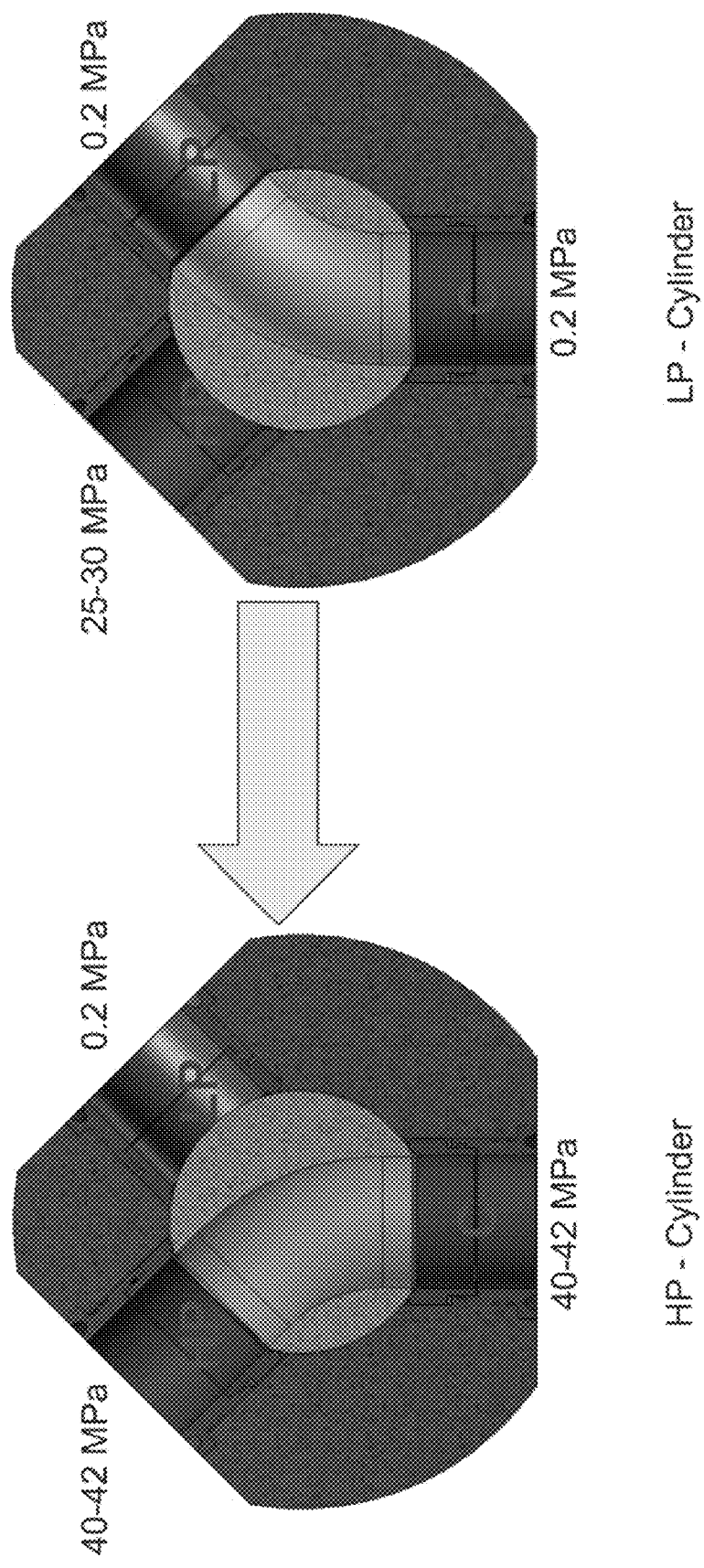

Electric actuation is a reliable and commercially viable mode of actuation, when used in combination with the pressure balanced rotor valve described herein. Heretofore unknown benefits can be realized. For example, electric actuation provides for greater control of valve actuation than traditional valves that use other actuation schemes or cost-prohibitive components. Moreover, this method of actuation facilitates port shaping and configuration of the decompression actuation profile independent of other system parameters (e.g., in a hydraulic system, such parameters may include oil viscosity and pressure). FIG. 11 is a simulation of electric actuation for the electrically actuated valve depicted in FIG. 1. In accordance with one embodiment of the invention, the early portion of a valve actuation cycle may be shaped according to the needs of decompression, by applying a varying tailored amount of current to the motor according to any of a variety of selectable control schemes, allowing for a finely adjustable opening/closing of the valve. Electric actuation further provides a method of counteracting flow path erosion and controlling pressure impulses due to decompression, based on the ability to dwell or tailor any of a variety of port open/close states in combination with sub-millisecond control resolution.

Electric actuation allows the rotary valve to be deterministically controlled, as opposed to hydraulically actuated valves and other valve designs that may behave unpredictably when the various ports experience different pressures. To this effect, the valve may include a rotary encoder 75 mounted to the lower end of the rotor 4 (FIG. 3) to track angular position and/or speed of the rotor 4 relative to the housing 1. Deterministic control of the valve refers to having knowledge of the position and the behavior of the valve in all states. Accordingly, the ability to actuate the valve is not impacted by the state of the system. In contrast, in a hydraulic actuated valve, the ability to actuate the valve depends on various factors, including hydraulic fluid quality, viscosity (temperature), contamination, wear on the pilot surfaces in the actuation system, the pressure state of the system against which the valve is actuating, etc.

In various embodiments, the rotary valve may operate in a switching mode, in which the ability to actuate the valve is maintained, regardless of the pressure differential across the valve ports 30 and independently of the operating state of the connected system. For example, in a CAES system, the valve needs to actuate regardless of whether the cylinder of the CAES system is in a compression mode or in an expansion mode. Further, a minimum acceptable response time should be maintained irrespective of pressure and pressure differential.

Figure 16:
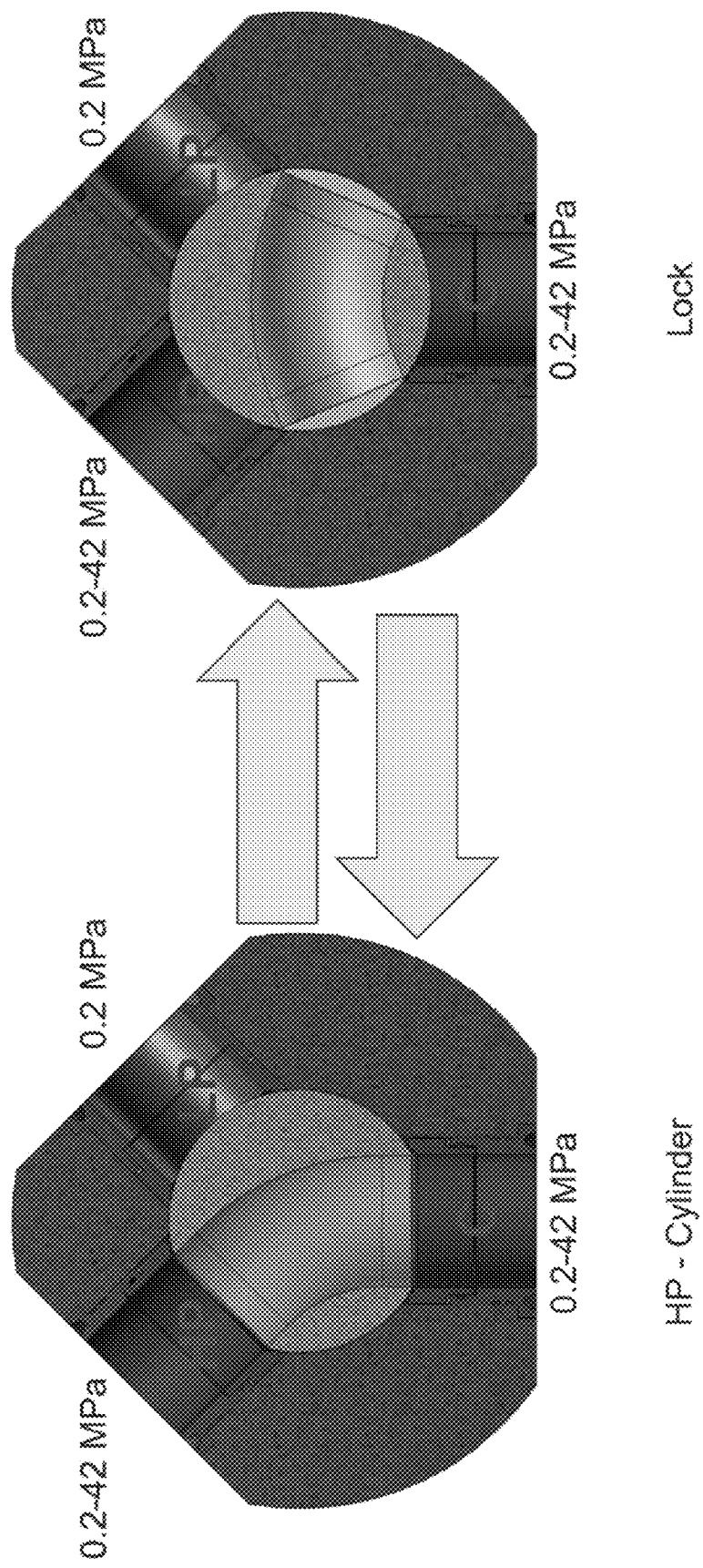

Referring then to the three port valve embodiment depicted in FIGS. 12-17, the valve may actuate to the following states: (1) connect high pressure (HP) port and cylinder (C) port; (2) connect low pressure (LP) port and C port; and (3) full shutoff. In some embodiments, the valve may be configured to allow open transition among all three HP, LC and C ports. FIGS. 12-15 illustrate exemplary actuation scenarios of the rotary valve as used in a CAES system, including actuation to connect either the LP or HP port with the C port that is coupled to the CAES hydraulic cylinder, in both expansion and compression modes. FIGS. 16-17 depict the valve transitioning to and from a lock state. Exemplary relative pressures are provided for illustrative purposes and should not be considered limiting, but rather descriptive of one particular application.

In addition to the switching (actuation) mode, the rotary valve may also operate in idle, emergency shutdown, and shutdown modes. In idle mode, a lock on the piston position is maintained at all times, irrespective of the power state of the actuator and any pressure acting on the valve ports. In emergency shutdown (failsafe) mode, the valve is able to shut all valve ports irrespective of the aforementioned conditions; however, leakage during port shutoff may be permitted, such that any piston droop does not cause significant acceleration or velocity. In the shutdown mode, the position of the valve may advantageously be made available to the operator when the connected system (hydraulic or otherwise) is in a shutdown state. Further, the valve should be able to be actuated when the system drivetrain and all other sources of hydraulic or non-hydraulic energy are shut down.

In yet other embodiments, the rotary valve assembly includes valve ports 30 that are not aligned in a single plane, for example a radial plane perpendicular to the rotational axis of the rotor 4. In these configurations, the flow passageway 40 in the rotor 4 is adapted to connect inlet and outlet valve ports 30 on various planes, and pressure ports 35 may be disposed at any suitable location to provide an interface for fluid to react the total required balancing force against the rotor 4. When the flow passageway 40 is arcuate or curved, torque is induced in the rotor 4 by pressurized fluid entering the passageway 40. If the valve ports 30 are aligned in the radial plane, the torque occurs around the rotational axis of the rotor 4 and the electric motor 13 may operate to react the flow-induced rotor torque. However, when valve ports are disposed outside that plane, torque is induced around other axes of the rotor, which may be reacted by a combination of the motor 13 and pressure balancing seals aligned to provide opposing forces at the desired pressure balance zones on the rotor 4.

Figure 18A:
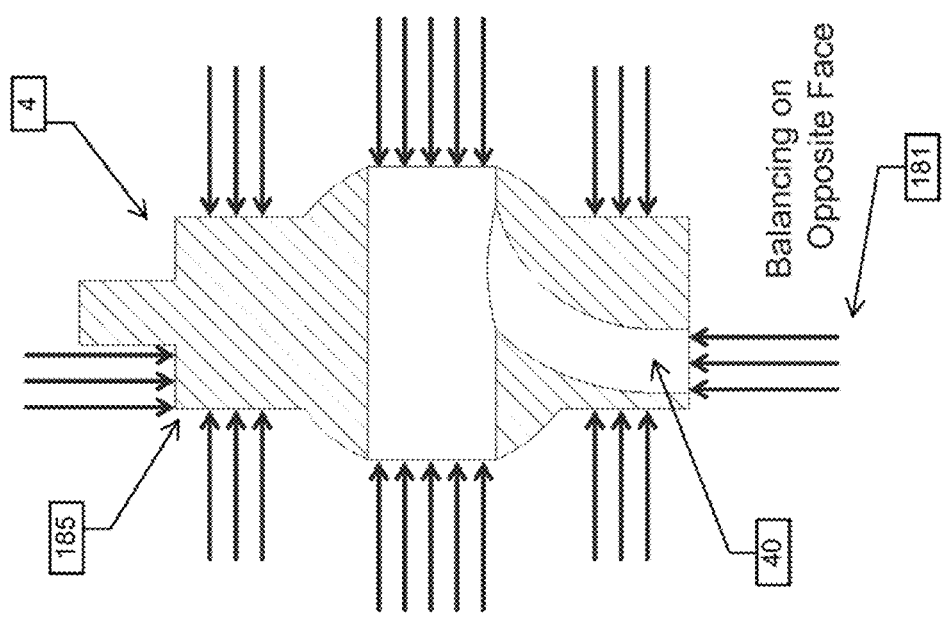
FIGS. 18A-D are schematic free body diagrams of a pressure balanced rotor of a valve in accordance with various alternative embodiments of the invention.
Figure 18B:
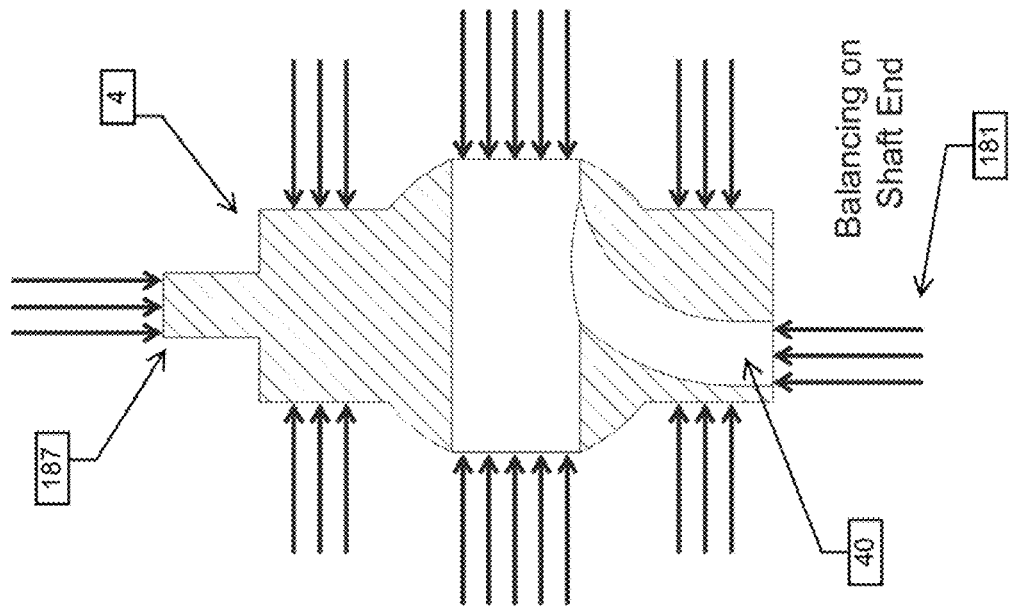

For example, referring to FIGS. 18A-B, one embodiment of the assembly includes one or more valve ports 30 disposed on an end cap 2 and entering the inner chamber of the housing 1 substantially parallel with the rotational axis of the rotor 4. The valve port 30 on the end cap 2 penetrates the end of rotor 4, and the opposing end of the rotor 4 may be used to accommodate a pressure zone and balance seal. The port and balance areas are eccentric with respect to the axis of rotation, thereby providing space for the concentric attachment of the electric actuator. To react the force 181 of fluid entering the flow passageway 40 of the rotor 4, various configurations of counterbalancing pressure zones are possible. For example, in FIG. 18A, an axial counterbalancing force is applied to a pressure zone 185 on the end face of the rotor 4 directly opposing the inlet pressure port; whereas, in FIG. 18B, the pressure zone 187 for applying an axial reacting force is located centrally on the end of the rotor 4. Other forces may also be applied in various magnitudes to pressure zones on various surfaces of the rotor 4 to react torque induced by the entering fluid and/or offset pressure zones.

Figure 18D:
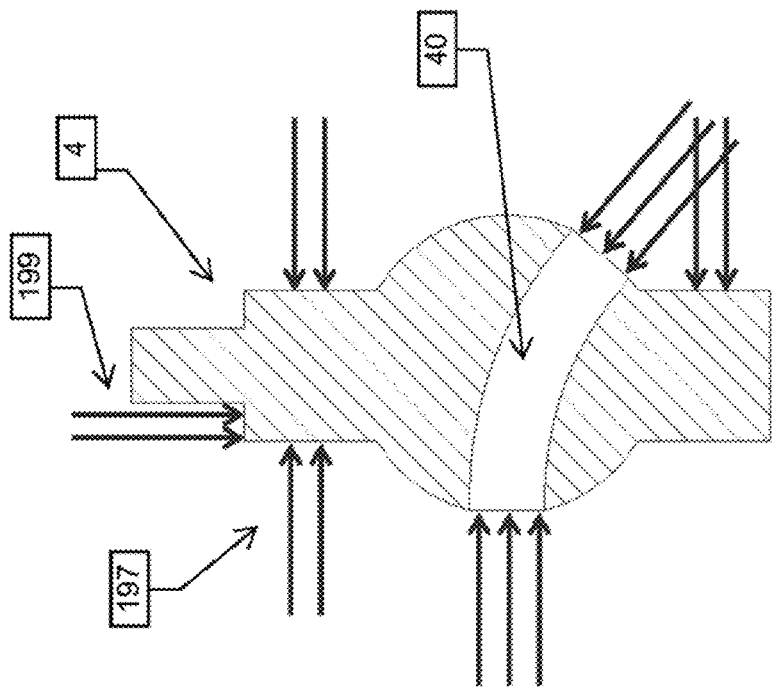
Figure 18C:
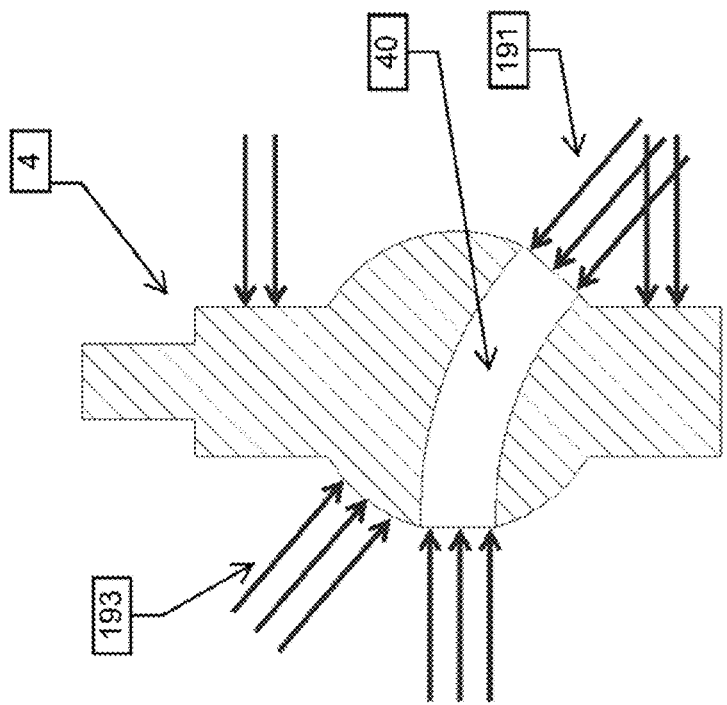

Referring now to FIGS. 18C-D, another embodiment of the assembly includes one or more valve ports 30 not parallel with the rotational axis of the rotor 4. In FIG. 18C, the force 191 applied to the rotor 4 by fluid entering the passageway 40 is met by a counterbalancing force 193 applied to the spherical portion of the rotor 4 and diametrically opposed to the valve inlet port. In FIG. 18D, the reaction forces are instead divided into axial and perpendicular component force directions. The perpendicular force 197 is reacted on the cylindrical face of the rotor 4, whereas the axial force 199 is reacted on the end face of the rotor 4. Depending on the out-of-plane angle, balancing for the inlet valve port may not be necessary, as each individual force may be reduced by up to 30% (e.g., for a 45° out-of-plane port) and can be accommodated by the bearings and/or the capacity of the electric actuator.

Balancing may occur for none, one, two, or more of component force directions depending on the ability of the rotor bearings to react the load. For example, thrust bearings may have a higher load carrying capacity, and therefore forces parallel to the axis of rotation may not need to be balanced. Conversely, at high out-of-plane angles the force perpendicular to the axis of rotation may become small enough to not require balancing, while the force parallel to the axis of rotation could be balanced. In either case, the balancing of the out-of-plane port is an optimization problem, with the out-of-plane angle at the core of the optimization.

In some embodiments, the rotary valve operates in a pressure range of 0 to 600 Bar, and is able to operate continuously at maximum pressures in the range of 420 to 600 Bar. The valve may support flow rates of 2500 to 60,000 liters per minute when operating on slurry, water or other fluids, and may support a flow rate of up to 225,000 liters per minute when operating on air or other gases. The valve may have a pressure drop of less than 0.25 Bar and operate in a temperature range of −30° to 70° C. (ambient) and −30° to 120° (media); however, the temperature ranges may be significantly higher depending on the construction and materials used. The valve may actuate from 10% to 90% open in less than 75 ms with less than 1 ms resolution. Further, the valve may generate torque ranging from 100 to 3000 N-m.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Various aspects and features of the various embodiments of the invention may be used in various combinations and permutations and all such variants are considered to be within the scope of the invention.

What is claimed is:
1. A rotary valve assembly comprising:
 a housing forming an inner chamber;
 a plurality of valve ports comprising at least a first valve port and a second valve port disposed about a periphery of the housing and in fluidic communication with the inner chamber;

a rotor rotatably disposed within the inner chamber and including at least one internal flow passageway for providing fluidic communication between two of the plurality of valve ports;

a first pair of counterbalancing pressure ports disposed in the housing opposite the first valve port and in fluidic communication with the first valve port and a surface of the rotor, whereby fluid entering the first valve port applies a balancing radial force component to an outer surface of the rotor at the first pair of pressure ports; and a second pair of counterbalancing pressure ports disposed in the housing opposite the second valve port and in fluidic communication with the second valve port and a surface of the rotor, whereby fluid entering the second valve port applies a balancing radial force component to an outer surface of the rotor at the second pair of pressure ports.

2. The rotary valve assembly of claim 1, wherein the housing comprises a substantially cylindrical shell and opposing end plates.

3. The rotary valve assembly of claim 1, wherein the plurality of valve ports comprises three circular ports.

4. The rotary valve assembly of claim 3, wherein the three ports are disposed at zero degrees, a range from 90 to 180 degrees, and a range from 180 to 270 degrees respectively about the periphery.

5. The rotary valve assembly of claim 1, wherein the rotor comprises a spherical portion for sealing engagement with the valve ports.

6. The rotary valve assembly of claim 5, further comprising respective seals between the spherical portion and each valve port.

7. The rotary valve assembly of claim 6, wherein the seals comprise pressure-balanced seals.

8. The rotary valve assembly of claim 5, wherein the internal flow passageway is formed in the spherical portion and comprises a flow path between the first valve port and the second valve port.

9. The rotary valve assembly of claim 8, wherein the flow path comprises an arcuate turn in a range of up to 90 degrees.

10. The rotary valve assembly of claim 1, wherein the rotor comprises cylindrical end portions extending from a spherical portion and each of the pressure ports is adapted to react against a respective end portion of the rotor.

11. The rotary valve assembly of claim 10, further comprising a pair of pressure ports opposite each of the plurality of valve ports.

12. The rotary valve assembly of claim 10, wherein each of the first pair of pressure ports is located axially equidistant from the first valve port.

13. The rotary valve assembly of claim 1, further comprising an actuator for rotating the rotor relative to the housing.

14. The rotary valve assembly of claim 13, wherein the actuator comprises an electric motor.

15. The rotary valve assembly of claim 14, wherein the electric motor comprises a failsafe energy storage device for providing backup power to the motor, permitting continued operation of the valve assembly upon loss of a primary power source.

16. The rotary valve assembly of claim 1, wherein the assembly is adapted to operate continuously in a pressure range of up to at least about 420 Bar.

17. The rotary valve assembly of claim 1, wherein the assembly is adapted to operate in at least one of a hydraulic system with a volumetric flow rate in a range of up to about 40,000 liters per minute and a pneumatic system with a volumetric flow rate in a range of up to about 225,000 liters per minute.

18. The rotary valve assembly of claim 1, wherein the assembly is adapted to operate in a hydraulic system with an actuation torque in a range of about 400 N-m to about 1200 N-m.

19. A method of pressure balancing a rotor in a rotary valve assembly adapted for use in a hydraulic system, the method comprising the steps of:

receiving a first flow at an first valve port of the rotary valve assembly;

channeling the first flow to a first pair of counterbalancing pressure ports disposed opposite the first valve port and in fluidic communication with the first valve port and a surface of the rotor;

applying, by the first flow, a balancing radial force component to an outer surface of the rotor at the first pair of pressure ports;

receiving a second flow at a second valve port of the rotary valve assembly;

channeling the second flow to a second pair of counterbalancing pressure ports disposed opposite the second valve port and in fluidic communication with the second valve port and a surface of the rotor; and applying, by the second flow, a balancing radial force component to an outer surface of the rotor at the second pair of pressure ports.

20. The method of claim 19, wherein the rotary valve assembly comprises:

a housing forming an inner chamber; and a plurality of valve ports comprising at least the first valve port and a second valve port disposed about a periphery of the housing and in fluidic communication with the inner chamber, wherein the rotor is rotatably disposed within the inner chamber and includes at least one internal flow passageway for providing fluidic communication between two of the plurality of valve ports.

21. The method of claim 20, wherein the housing comprises a substantially cylindrical shell and opposing end plates.

22. The method of claim 20, wherein the plurality of valve ports comprises three circular ports.

23. The method of claim 22, wherein the three ports are disposed at zero degrees, a range from 90 to 180 degrees, and a range from 180 to 270 degrees respectively about the periphery.

24. The method of claim 20, wherein the rotor comprises a spherical portion for sealing engagement with the valve ports.

25. The method of claim 24, wherein the rotary valve assembly further comprises respective seals between the spherical portion and each valve port.

26. The method of claim 25, wherein the seals comprise pressure-balanced seals.

27. The method of claim 24, wherein the internal flow passageway is formed in the spherical portion and comprises a flow path between the first valve port and the second valve port.

28. The method of claim 27, wherein the wherein the flow path comprises an arcuate turn in a range of up to 90 degrees.

29. The method of claim 20, wherein the rotor comprises cylindrical end portions extending from a spherical portion and each of the pressure ports is adapted to react against a respective end portion of the rotor.

30. The method of claim 29, wherein the rotary valve assembly further comprises a pair of pressure ports opposite each of the plurality of valve ports.

31. The method of claim 29, wherein each of the first pair of pressure ports is located axially equidistant from the first valve port.

32. The method of claim 20, wherein the rotary valve assembly further comprises an actuator for rotating the rotor relative to the housing.

33. The method of claim 32, wherein the actuator comprises an electric motor.

34. The method of claim 33, wherein the electric motor comprises a failsafe energy storage device for providing backup power to the motor, permitting continued operation of the valve assembly upon loss of a primary power source.

35. The method of claim 19, wherein the rotary valve assembly is adapted to operate continuously in a pressure range of up to at least about 420 Bar 36. The method of claim 19, wherein the rotary valve assembly is adapted to operate in at least one of a hydraulic system with a volumetric flow rate in a range of up to about 40,000 liters per minute and a pneumatic system with a volumetric flow rate in a range of up to about 225,000 liters per minute.

37. The method of claim 19, wherein the rotary valve assembly is adapted to operate in a hydraulic system with an actuation torque in a range of about 400 N-m to about 1200 N-m.

* * * * *